(12) United States Patent
Papasakellariou

(10) Patent No.: US 11,765,716 B2
(45) Date of Patent: Sep. 19, 2023

(54) SCHEDULING ON A CELL FROM DIFFERENT CELLS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 146 days.

(21) Appl. No.: 17/304,736

(22) Filed: Jun. 24, 2021

(65) Prior Publication Data

US 2022/0022221 A1    Jan. 20, 2022

Related U.S. Application Data

(60) Provisional application No. 63/052,781, filed on Jul. 16, 2020, provisional application No. 63/055,095, filed on Jul. 22, 2020.

(51) Int. Cl.
*H04W 72/12* (2023.01)
*H04L 1/18* (2023.01)
(Continued)

(52) U.S. Cl.
CPC ....... *H04W 72/1268* (2013.01); *H04L 1/1812* (2013.01); *H04W 72/23* (2023.01); *H04W 76/28* (2018.02)

(58) Field of Classification Search
CPC ... H04W 28/04; H04W 72/04; H04W 72/042; H04W 88/08; H04W 72/1268;
(Continued)

(56) References Cited

U.S. PATENT DOCUMENTS

2013/0083707 A1* 4/2013 Wang ............... H04W 72/1289
370/280
2020/0029338 A1* 1/2020 Lee ........................ H04L 5/00
(Continued)

FOREIGN PATENT DOCUMENTS

EP          3 716 520 A1 *  3/2020  ............ H04L 5/00
WO    WO 2019/099880 A1 *  5/2019  ............ H04W 76/28
(Continued)

OTHER PUBLICATIONS

3GPP TSG-RAN WG1 Meeting #101-e, e-Meeting, May 25-Jun. 5, 2020, R1-2005152, Title: Corrections of cross-slot scheduling restriction, Source of WG: Nokia, Nokia Shanghai Bell. (Year: 2020).*
(Continued)

*Primary Examiner* — Peter G Solinsky
*Assistant Examiner* — Sanjay K Dewan

(57) ABSTRACT

Methods and apparatuses for scheduling on a cell from different cells. A method for operating a UE includes receiving first information for first and second scheduling cells of a scheduled cell and second information for receptions of physical downlink control channels (PDCCHs) from the first and second scheduling cells. The PDCCHs provide downlink control information (DCI) formats. The DCI formats schedule physical uplink shared channel (PUSCH) transmissions, or physical downlink shared channel (PDSCH) receptions, on the scheduled cell. The method further includes determining whether to receive the PDCCHs either only from the first scheduling cell or only from the second scheduling cell within a time unit based on the second information and receiving the PDCCHs either only from the first scheduling cell or only from the second scheduling cell within the time unit.

20 Claims, 18 Drawing Sheets

(51) Int. Cl.
*H04W 76/28* (2018.01)
*H04W 72/1268* (2023.01)
*H04L 1/1812* (2023.01)
*H04W 72/23* (2023.01)

(58) Field of Classification Search
CPC .............. H04W 76/28; H04W 72/1289; H04L 5/0007; H04L 1/1812
USPC .......................................................... 370/329
See application file for complete search history.

(56) References Cited

U.S. PATENT DOCUMENTS

| | | | | |
|---|---|---|---|---|
| 2020/0154295 | A1* | 5/2020 | Lin | H04W 52/0216 |
| 2021/0022111 | A1* | 1/2021 | Kumar | H04W 68/02 |
| 2021/0360733 | A1* | 11/2021 | Bao | H04W 64/00 |
| 2022/0150946 | A1* | 5/2022 | Tsai | H04L 1/1861 |
| 2023/0108745 | A1* | 4/2023 | Yang | H04W 74/08 370/329 |

FOREIGN PATENT DOCUMENTS

| | | | | | |
|---|---|---|---|---|---|
| WO | WO 2020/064770 | A1 * | 4/2020 | ............. | H04W 52/02 |
| WO | WO 2022/152924 | A1 * | 7/2022 | ............... | H04L 5/00 |

OTHER PUBLICATIONS

3GPP TSG RAN WG1 Meeting #101-e, E-meeting, May 25-Jun. 5, 2020, R1-2005059, Agenda item: 7.2.5.1, Source (Moderator (Huawei), Title: Email discussion/approval [101-e-NR-L1 enh-URLLC-PDCCH enhancement-01] on remaining issues on DCI format design and proposed conclusion #1. (Year: 2020).*

3GPP TSG-RAN WG1 Meeting #101-e, e-Meeting, May 25-Jun. 5, 2020, R1-2005140, Title: Corrections on Ultra Reliable Low Latency Communications Enhancements, Source to WG: Samsung. (Year: 2020).*

"5G; NR; Physical channelsand modulation (3GPPTS 38.211 version 16.2.0 Release 16)", ETSI TS 138 211 V16.2.0, Jul. 2020, 136 pages.

"5G; NR; Multiplexing and channel coding (3GPP TS 38.212 version 16.2.0 Release 16)", ETSI TS 138 212 V16.2.0, Jul. 2020, 154 pages.

"5G; NR; Physical layer procedures for control (3GPP TS 38.213 version 16.2.0 Release 16)", ETSI TS 138 213 V16.2.0, Jul. 2020, 180 pages.

"5G; NR; Physical layer procedures for data (3GPP TS 38.214 version 16.2.0 Release 16)", ETSI TS 138 214 V16.2.0, Jul. 2020, 167 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

International Search Report and Written Opinion of the International Searching Authority in connection with International Application No. PCT/KR2021/009112 dated Oct. 18, 2021, 8 pages.

Samsung, "Corrections on Ultra Reliable Low Latency Communications Enhancements", R1-2005140, 3GPP TSG-RAN WG1 Meeting #101-e, e-Meeting, May 25-Jun. 5, 2020, 29 pages.

Nokia et al., "Corrections of cross-slot scheduling restriction", R1-2005152, 3GPP TSG-RAN WG1 Meeting #101-e, e-Meeting, May 25-Jun. 5, 2020, 6 pages.

Moderator (Huawei), "Email discussion/approval [101-e-NR-L1enh-URLLC-PDCCH enhancements-01] on remaining issues on DCI format design and proposed conclusion #1", R1-2005059, 3GPP TSG-RAN WG1 Meeting #101-e, e-Meeting, May 25-Jun. 5, 2020, 66 pages.

* cited by examiner

SCHEDULING ON A CELL FROM DIFFERENT CELLS

CROSS-REFERENCE TO RELATED APPLICATION AND CLAIM OF PRIORITY

This application claims priority under 35 U.S.C. § 119(e) to U.S. Provisional Patent Application No. 63/052,781 filed on Jul. 16, 2020 and U.S. Provisional Patent Application No. 63/055,095 filed on Jul. 22, 2020. The above-identified provisional patent applications are hereby incorporated by reference in their entirety.

TECHNICAL FIELD

The present disclosure relates generally to wireless communication systems and, more specifically, the present disclosure relates to procedures for scheduling on a cell from different cells.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to procedures for scheduling on a cell from different cells.

In one embodiment, a method is provided. The method includes receiving first information for first and second scheduling cells of a scheduled cell and second information for receptions of physical downlink control channels (PDCCHs) from the first and second scheduling cells. The PDCCHs provide downlink control information (DCI) formats with cyclic redundancy checks (CRCs) scrambled by: a cell radio network temporary identifier (C-RNTI), a configured scheduling RNTI (CS-RNTI), or a modulation and coding scheme C-RNTI (MCS-C-RNTI). The DCI formats schedule physical uplink shared channel (PUSCH) transmissions, or physical downlink shared channel (PDSCH) receptions, on the scheduled cell. The method further includes determining whether to receive the PDCCHs either only from the first scheduling cell or only from the second scheduling cell within a time unit based on the second information and receiving the PDCCHs either only from the first scheduling cell or only from the second scheduling cell within the time unit.

In another embodiment, a user equipment (UE) is provided. The UE includes a transceiver configured to receive first information for first and second scheduling cells of a scheduled cell and second information for receptions of PDCCHs from the first and second scheduling cells. The PDCCHs provide DCI formats with CRCs scrambled by: a C-RNTI, a CS-RNTI, or a MCS-C-RNTI. The DCI formats schedule PUSCH transmissions, or PDSCH receptions, on the scheduled cell. The UE also includes a processor operably coupled to the transceiver. The processor is configured to determine whether reception of the PDCCHs is either only from the first scheduling cell or only from the second scheduling cell within a time unit based on the second information. The transceiver is further configured to receive the PDCCHs either only from the first scheduling cell or only from the second scheduling cell within the time unit.

In yet another embodiment, a base station is provided. The base station includes a transceiver configured to transmit first information for first and second scheduling cells of a scheduled cell and second information for receptions of PDCCHs from the first and second scheduling cells. The PDCCHs provide DCI formats with CRC scrambled by: a C-RNTI, CS-RNTI, or a MCS-C-RNTI. The DCI formats schedule PUSCH transmissions, or PDSCH receptions, on the scheduled cell. The base station also includes a processor operably coupled to the transceiver, the processor configured to determine whether transmission of the PDCCHs is either only from the first scheduling cell or only from the second scheduling cell within a time unit according to the second information. The transceiver is further configured to transmit the PDCCHs either only from the first scheduling cell or only from the second scheduling cell within the time unit.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
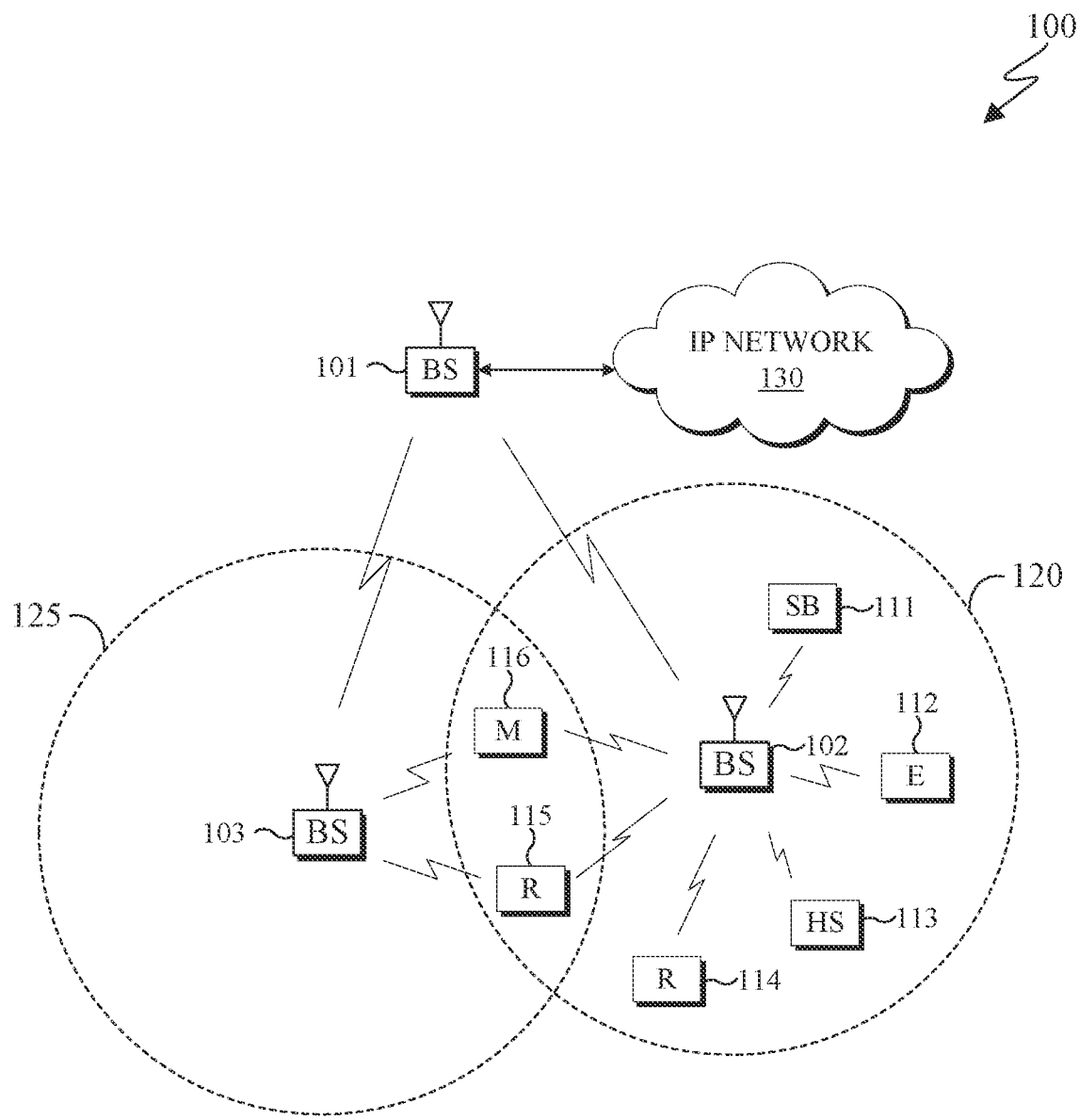
FIG. 1 illustrates an example wireless network according to embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.2.0, "NR; Physical channels and modulation;" 3GPP TS 38.212 v16.2.0, "NR; Multiplexing and Channel coding;" 3GPP TS 38.213 v16.2.0, "NR; Physical Layer Procedures for Control;" 3GPP TS 38.214 v16.2.0, "NR; Physical Layer Procedures for Data;" 3GPP TS 38.321 v16.1.0, "NR; Medium Access Control (MAC) protocol specification;" and 3GPP TS 38.331 v16.1.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
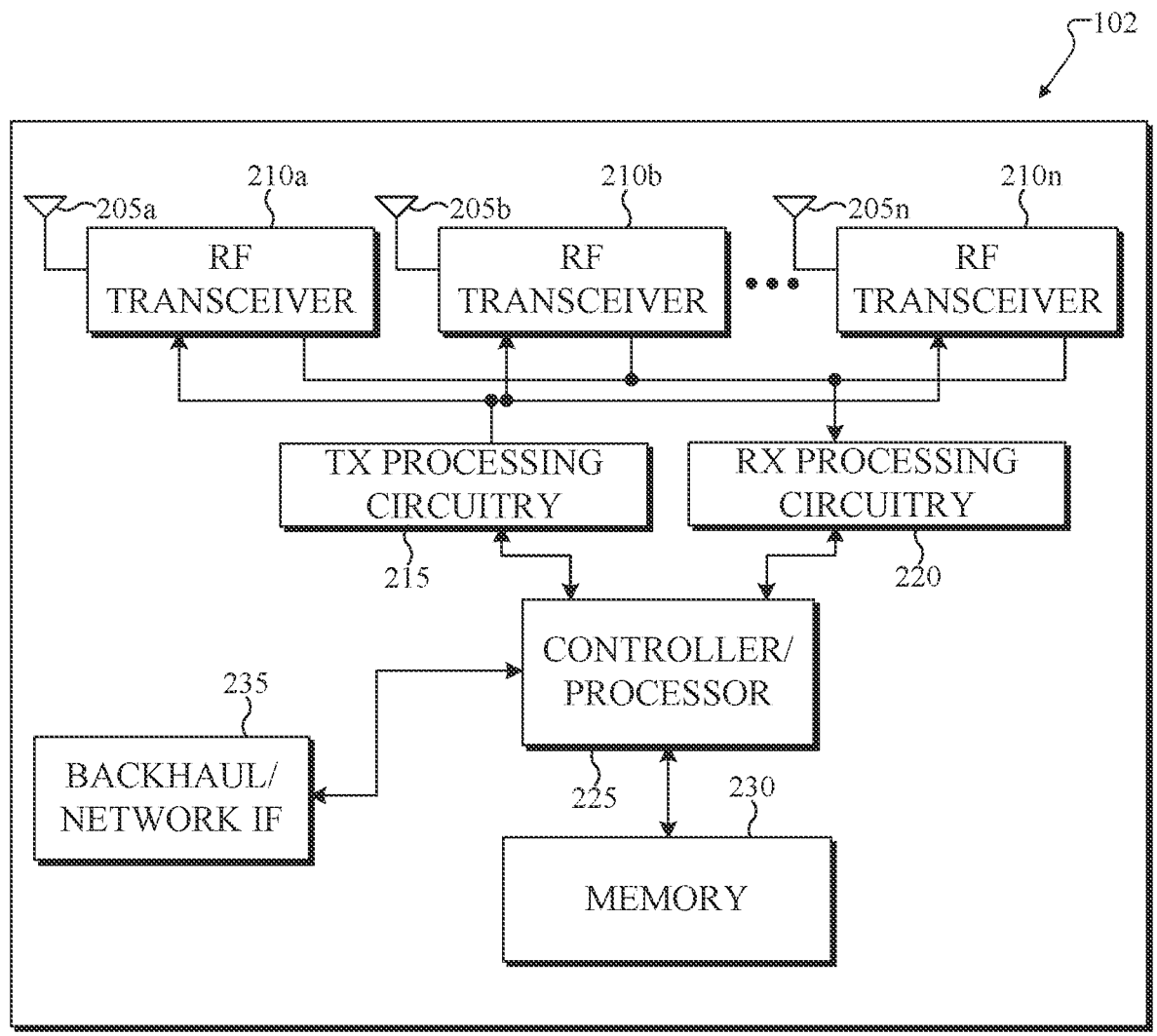
FIG. 2 illustrates an example base station (BS) according to embodiments of the present disclosure.
Figure 3:
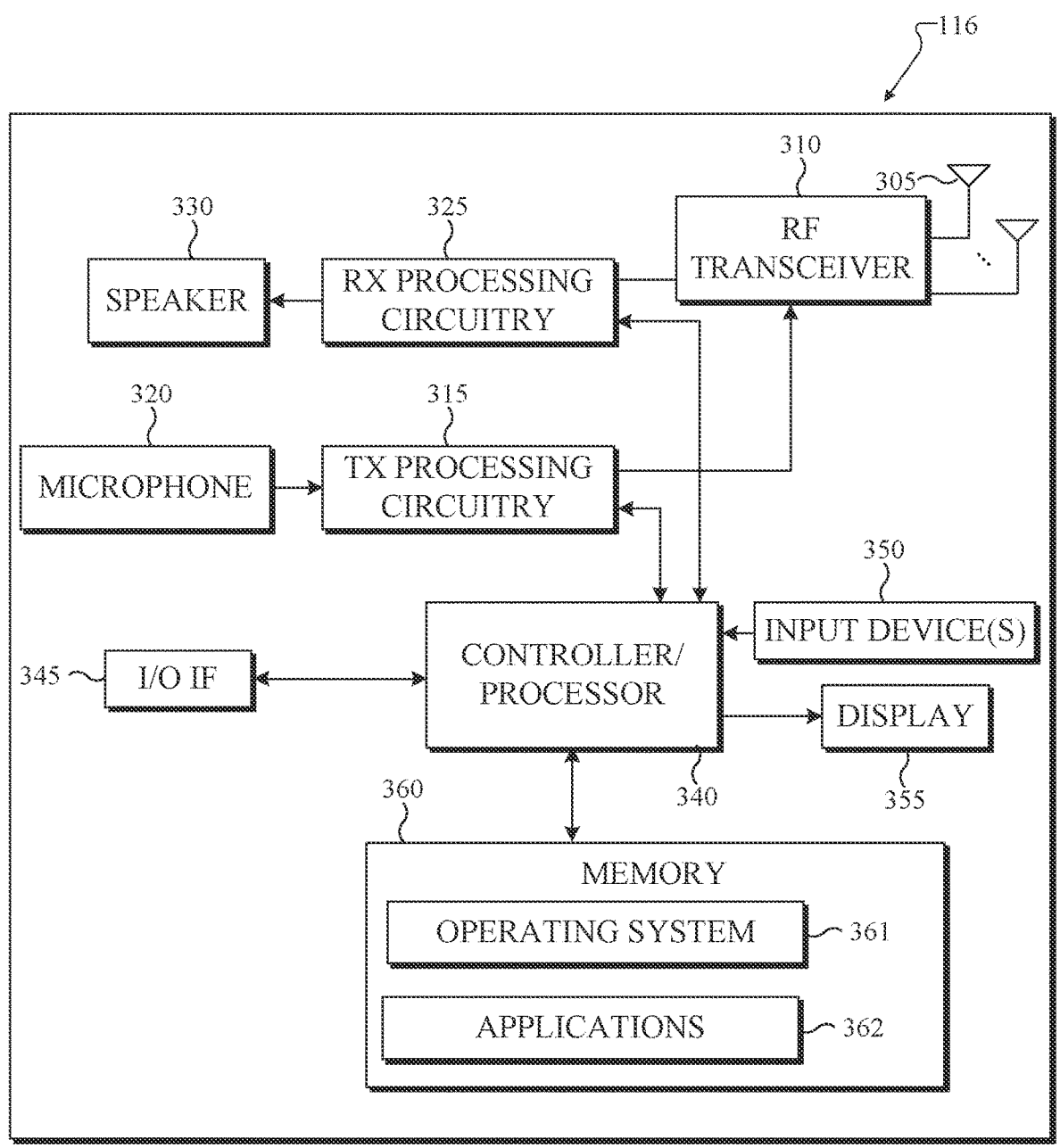
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for scheduling on a cell. In certain embodiments, and one or more of the BSs 101-103 includes circuitry, programing, or a combination thereof for scheduling on a cell for different cells.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similar, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support scheduling on a cell for different cell as well as signaling for variable scheduling latency requirements. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
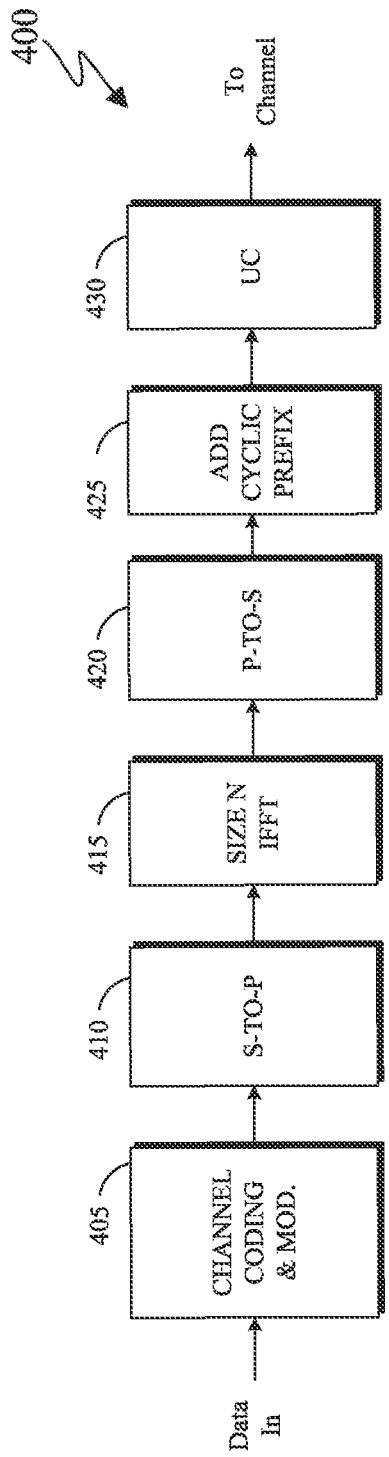
FIGS. 4 and 5 illustrate example wireless transmit and receive paths according to embodiments of the present disclosure.
Figure 5:
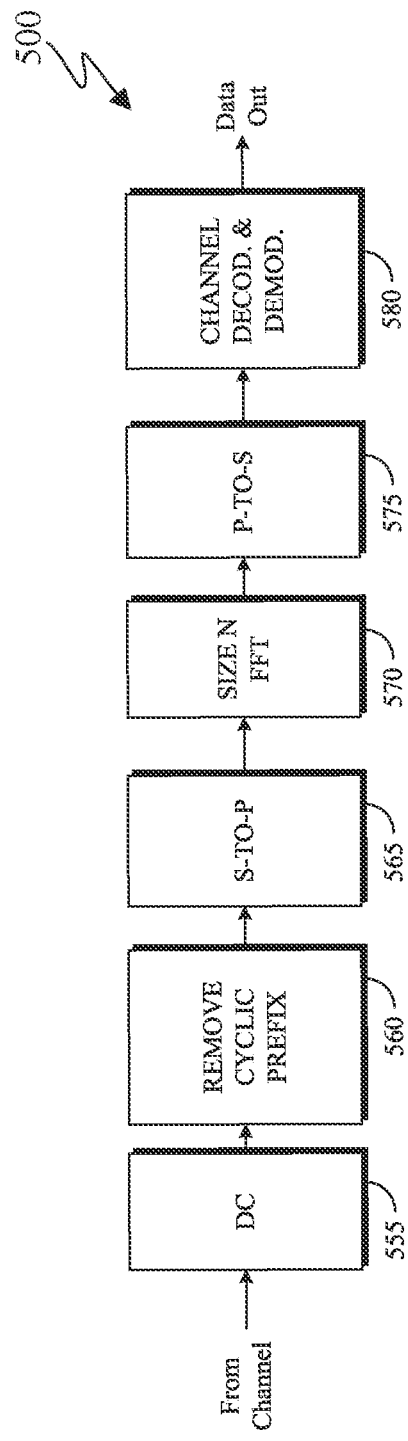

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support scheduling a cell as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding, or polar coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similar, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^\mu \cdot 15$ kHz. A unit of one sub-carrier over one symbol is referred to as a resource element (RE). A unit of one RB over one symbol is referred to as a physical RB (PRB). In certain embodiments, a slot can be either a full DL slot, or a full UL slot, or a hybrid slot similar to a special subframe in time division duplex (TDD) systems DL signals include data signals conveying information content, control signals conveying DL control information (DCI), reference signals (RS), and the like that are also known as pilot signals. A BS (such as the BS 102) transmits data information or DCI through respective physical DL shared channels (PDSCHs) or physical DL control channels (PDCCHs). A PDSCH or a PDCCH can be transmitted over a variable number of slot symbols including one slot symbol.

A BS transmits one or more of multiple types of RS including channel state information RS (CSI-RS) and demodulation RS (DM-RS). A CSI-RS is intended for UEs (such as the UE 116) to perform measurements and provide channel state information (CSI) to a BS. For channel measurement or for time tracking, non-zero power CSI-RS (NZP CSI-RS) resources can be used. For interference measurement reports (IMRs), CSI interference measurement (CSI-IM) resources can be used. The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB. A DM-RS is typically transmitted only within a BW of a respective PDCCH or PDSCH and a UE can use the DM-RS to demodulate data or control information.

UL signals also include data signals conveying information content, control signals conveying UL control information (UCI), DM-RS associated with data or UCI demodulation, sounding RS (SRS) enabling a gNB to perform UL channel measurement, and a random access (RA) preamble enabling a UE (such as the UE 116) to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes hybrid automatic repeat request acknowledgement (HARQ-ACK) information, indicating correct or incorrect detection of data transport blocks (TBs) or of code block groups (CBGs) in a PDSCH, scheduling request (SR) indicating whether a UE has data in its buffer to transmit, and CSI reports enabling a gNB to select appropriate parameters for PDSCH or PDCCH transmissions to a UE. A CSI report can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, of a CSI-RS resource indicator (CRI) used to obtain the CSI report, and of a rank indicator (RI) indicating a transmission rank for a PDSCH. In certain embodiments, UL RS includes DM-RS and SRS. DM-RS is typically transmitted within a BW of a respective PUSCH or PUCCH. A gNB can use a DM-RS to demodulate information in a respective PUSCH or PUCCH. SRS is transmitted by a UE to provide a gNB with an UL CSI and, for a TDD system, to also provide a PMI for DL transmission. Further, as part of a random access procedure or for other purposes, a UE can transmit a physical random access channel (PRACH).

DL transmissions and UL transmissions can be based on an orthogonal frequency division multiplexing (OFDM) waveform including a variant using DFT precoding that is known as DFT-spread-OFDM.

Figure 6:
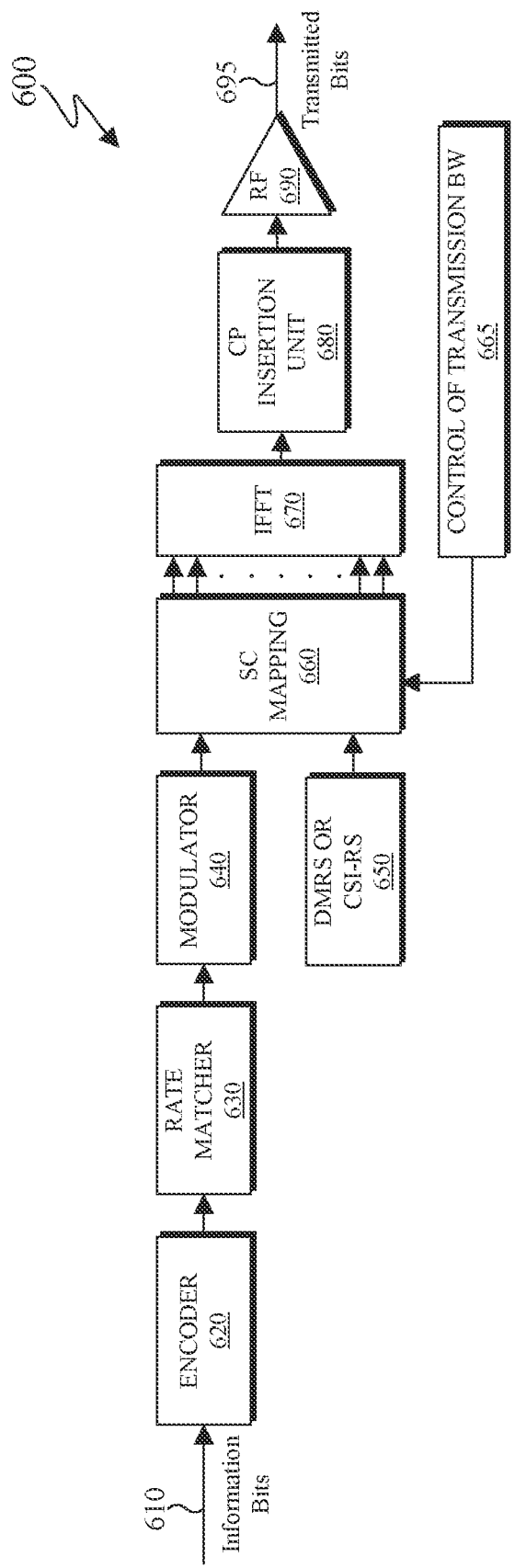
FIG. 6 illustrates a block diagram of an example transmitter structure using orthogonal frequency division multiplexing (OFDM) according to embodiments of the present disclosure.
Figure 7:
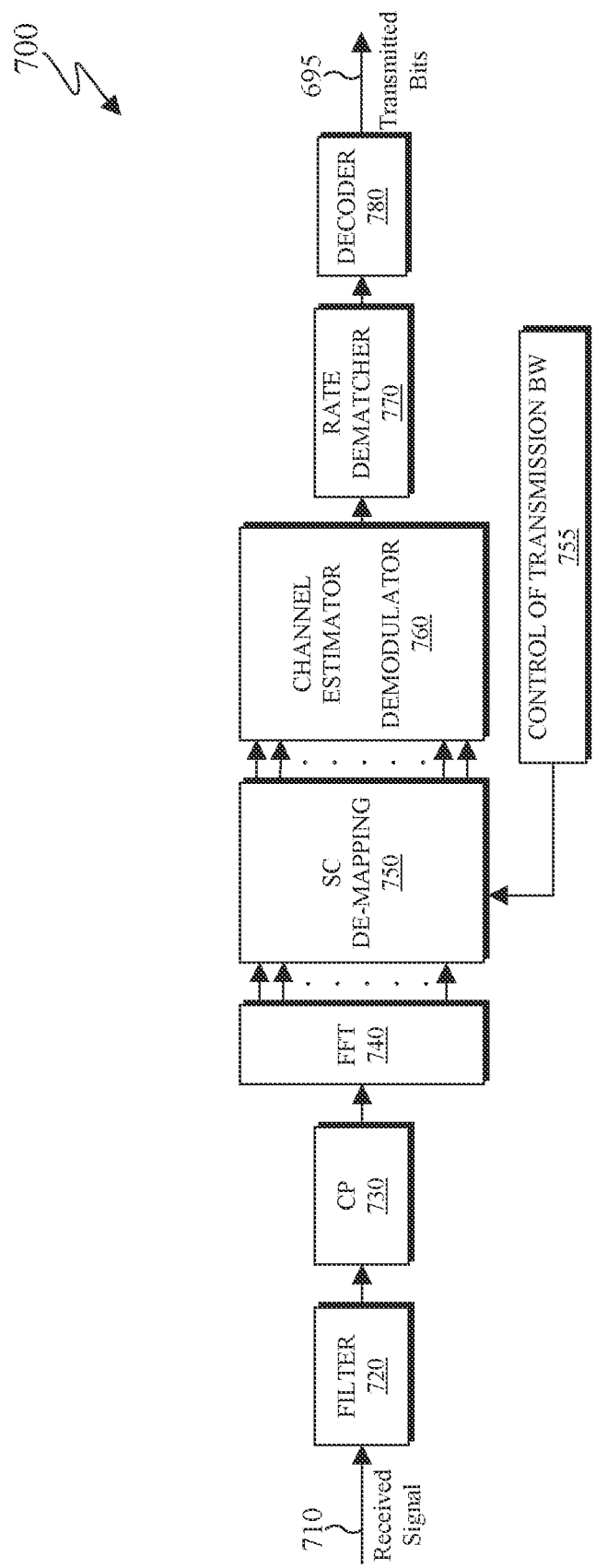
FIG. 7 illustrates a block diagram of an example receiver structure using OFDM according to embodiments of the present disclosure.

FIG. 6 illustrates a block diagram 600 of an example transmitter structure using orthogonal frequency division multiplexing (OFDM) according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 600 can be similar to the RF transceivers 210*a*-210*n* of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630, and modulated by modulator 640. Subsequently, modulated encoded symbols and DMRS or CSI-RS 650 are mapped to SCs by SC mapping unit 660 with input from BW selector unit 665, an inverse fast Fourier transform (IFFT) is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE monitors multiple candidate locations for respective potential PDCCH receptions to decode multiple DCI formats in a slot. A DCI format includes cyclic redundancy check (CRC) bits in order for the UE to confirm a correct detection of the DCI format. A type of a DCI format is identified by a radio network temporary identifier (RNTI) that scrambles the CRC bits of the DCI format.

For a DCI format scheduling a PDSCH or a PUSCH to a single UE, the RNTI can be a cell RNTI (C-RNTI), or a configured scheduling RNTI (CS-RNTI), or an MCS-C-RNTI and serves as a UE identifier. In the following examples, the C-RNTI will be referred to when needed. A UE typically receives/monitors PDCCH for detections of DCI formats with CRC scrambled by a C-RNTI according to a UE-specific search space (USS).

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. There are also a number of other RNTIs associated with DCI formats providing various control information and are monitored according to a common search space (CSS).

Figure 8:
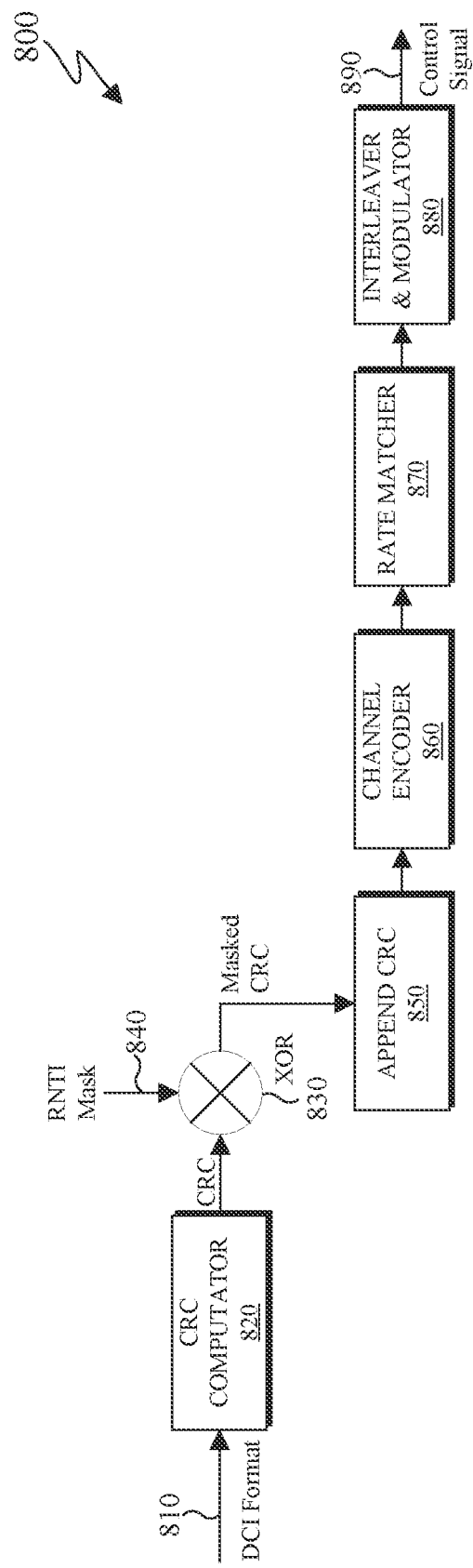
FIG. 8 illustrates an example encoding process for a downlink control information (DCI) format according to embodiments of the present disclosure.
Figure 9:
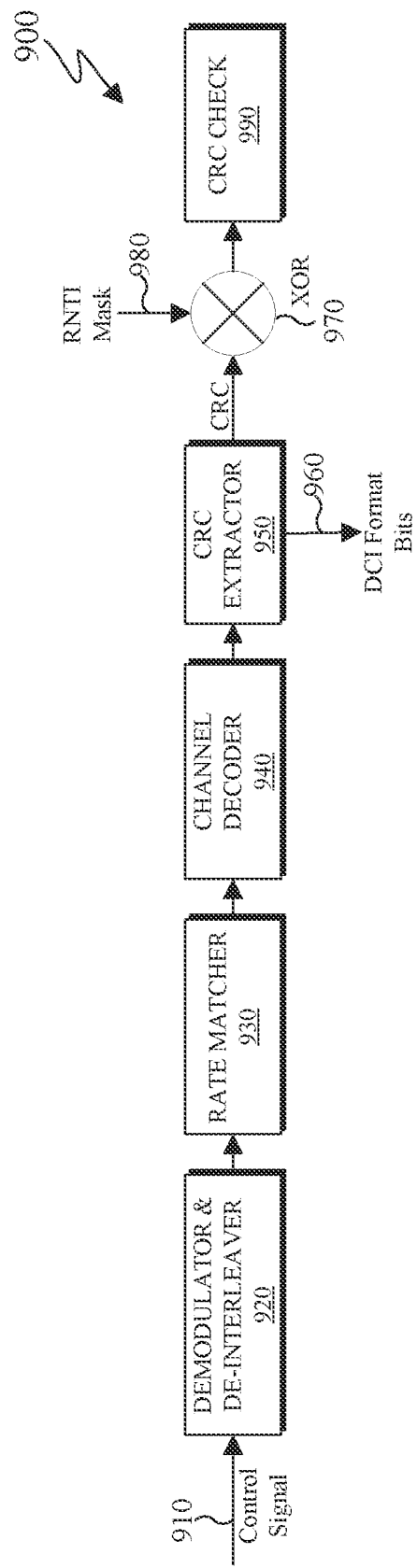
FIG. 9 illustrates an example decoding process for a DCI format for use with a UE according to embodiments of the present disclosure.

FIG. 8 illustrates an example encoding process 800 for a downlink control information (DCI) format according to embodiments of the present disclosure. FIG. 9 illustrates an example decoding process 900 for a DCI format for use with a UE according to embodiments of the present disclosure. The encoding process 800 of FIG. 8 and the decoding process 900 of FIG. 9 are for illustration only and other embodiments can be used without departing from the scope of the present disclosure.

A BS separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format.

As illustrated in FIG. 8, the CRC of (non-coded) DCI format bits 810 is determined using a CRC computation unit 820, and the CRC is masked using an exclusive OR (XOR) operation unit 830 between CRC bits and RNTI bits 840. The XOR operation is defined as XOR(0,0)=0, XOR(0,1)=1, XOR(1,0)=1, XOR(1,1)=0. The masked CRC bits are appended to DCI format information bits using a CRC append unit 850. An encoder 860 performs channel coding (such as tail-biting convolutional coding or polar coding), followed by rate matching to allocated resources by rate matcher 870. Interleaving and modulation units 880 apply interleaving and modulation, such as QPSK, and the output control signal 890 is transmitted.

As illustrated in FIG. 9, a received control signal 910 is demodulated and de-interleaved by a demodulator and a de-interleaver 920. A rate matching applied at a BS transmitter is restored by rate matcher 930, and resulting bits are decoded by decoder 940. After decoding, a CRC extractor 950 extracts CRC bits and provides DCI format information bits 960. The DCI format information bits are de-masked 970 by an XOR operation with a RNTI 980 (when applicable) and a CRC check is performed by unit 990. When the CRC check succeeds (check-sum is zero), the DCI format information bits are considered to be valid. When the CRC check does not succeed, the DCI format information bits are considered to be invalid.

In certain embodiments, a PDCCH transmission can be within a set of PRBs. A BS can configure a UE with one or more sets of PRB sets, also referred to as control resource sets (CORESETs), for PDCCH receptions. A PDCCH reception can be in control channel elements (CCEs) that are included in a CORESET.

A UE can monitor PDCCH according to a first PDCCH monitoring type or according to a second PDCCH monitoring type. For the first PDCCH monitoring type that corresponds to a UE capability for PDCCH monitoring per slot, a maximum number of PDCCH candidates $M_{PDCCH}^{max,slot,\mu}$ and a maximum number of non-overlapping CCEs $C_{PDCCH}^{max,slot,\mu}$ for the reception of PDCCH candidates is defined per slot. Non-overlapping CCEs are CCEs with different indexes or in different symbols of a CORESET or in different CORESETs.

For the second PDCCH monitoring type that corresponds to a UE capability for PDCCH monitoring per span, a maximum number of PDCCH candidates and a maximum number of non-overlapping CCEs for the reception of PDCCH candidates is defined per combination (X, Y). A UE (such as the UE 116) can indicate a capability to monitor PDCCH according to one or more of the combinations (X, Y)=(2, 2), (4, 3), and (7, 3) per SCS configuration of $\mu=0$ and $\mu=1$. A span is a number of consecutive symbols in a slot where the UE is configured to monitor PDCCH (receive a candidate/potential PDCCH and decode for a corresponding DCI format). Each PDCCH monitoring occasion is within one span. If a UE monitors PDCCH on a cell according to combination (X, Y), the UE supports PDCCH monitoring occasions in any symbol of a slot with minimum time separation of X symbols between the first symbol of two consecutive spans, including across slots. A span starts at a first symbol where a PDCCH monitoring occasion starts and ends at a last symbol where a PDCCH monitoring occasion ends, where the number of symbols of the span is up to Y. If a UE indicates a capability to monitor PDCCH according to multiple (X, Y) combinations and a configuration of search space sets to the UE for PDCCH monitoring on a cell results to a separation of every two consecutive PDCCH monitoring spans that is equal to or larger than the value of X for one or more of the multiple combinations (X, Y), the UE monitors PDCCH on the cell according to the combination (X, Y), from the one or more combinations (X, Y), that is associated with the largest maximum number of $M_{PDCCH}^{max,(X,Y),\mu}$ and $C_{PDCCH}^{max,(X,Y),\mu}$.

In certain embodiments, if a UE (such as the UE 116) can support a first set of $N_{cells,0}^{DL}$ serving cells and a second set of $N_{cells,1}^{DL}$ serving cells, then the UE determines, for the purpose of reporting pdcch-BlindDetectionCA, a number of serving cells as $N_{cells,0}^{DL}+R \cdot N_{cells,1}^{DL}$ where R is a value reported by the UE. In this embodiment, the (i) first set of $N_{cells,0}^{DL}$ serving cells are associated with a single TRP per cell and the UE is either not provided CORESETPoolIndex or is provided CORESETPoolIndex with a single value for all CORESETs on all DL BWPs of each serving cell from the first set of serving cells and (ii) the second set of $N_{cells,1}^{DL}$ serving cells is associated with two TRPs per cell and the UE is provided CORESETPoolIndex with a value 0 for a first CORESET and with a value 1 for a second CORESET on any DL BWP of each serving cell from the second set of serving cells.

In certain embodiments, if a UE (such as the UE 116) is (i) is configured with $N_{cells,0}^{DL,\mu}+N_{cells,1}^{DL,\mu}$ downlink cells, (ii) associated PDCCH candidates monitored in the active DL BWPs of the scheduling cell(s) using SCS configuration $\mu$, where $\Sigma_{\mu=0}^{3}(N_{cells,0}^{DL,\mu}+\gamma \cdot N_{cells,1}^{DL,\mu})>N_{cells}^{cap}$, and (iii) a DL BWP of an activated cell is the active DL BWP of the activated cell, and a DL BWP of a deactivated cell is the DL BWP with index provided by firstActiveDownlinkBWP-Id for the deactivated cell, then the UE is not required to monitor more than $M_{PDCCH}^{total,slot,\mu}=\lfloor N_{cells}^{cap} \cdot M_{PDCCH}^{max,slot,\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j})\rfloor$ PDCCH candidates or more than $C_{PDCCH}^{total,slot,\mu}=\lfloor N_{cells}^{cap} \cdot C_{PDCCH}^{max,slot,\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j})\rfloor$ non-overlapped CCEs per slot on the active DL BWP(s) of scheduling cell(s) from the $N_{cells,0}^{DL,\mu}+N_{cells,1}^{DL,\mu}$ downlink cells. In this example, $N_{cells}^{cap}$ is equal to 4 or is a capability reported by the UE. Additionally, in this example, $\gamma$ is a value that is provided by higher layers to the UE or is R.

For each scheduled cell, the UE is not required to monitor on the active DL BWP with SCS configuration $\mu$ of the scheduling cell from the $N_{cells,1}^{DL,\mu}$ downlink cells more than $\min(\gamma \cdot M_{PDCCH}^{max,slot,\mu}, M_{PDCCH}^{total,slot,\mu})$ PDCCH candidates or more than $\min(\gamma \cdot C_{PDCCH}^{max,slot,\mu}, C_{PDCCH}^{total,slot,\mu})$ non-overlapped CCEs per slot. Similar, for each scheduled cell, the UE is not required to monitor on the active DL BWP with SCS configuration $\mu$ of the scheduling cell from the $N_{cells,1}^{DL,\mu}$ downlink cells more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot for CORESETs with same CORESETPoolIndex value. If a CORESETPoolIndex is not provided for a cell or if a single CORESETPoolIndex is provided for a cell, then $\gamma=0$.

In certain embodiments, a UE determines CCEs for decoding a PDCCH candidate based on a search space. For some RNTIs, such as a C-RNTI, a set of PDCCH candidates for respective DCI formats define corresponding UE-specific search space sets. For other RNTIs, such as a SI-RNTI, a set of PDCCH candidates for respective DCI formats define corresponding common search space sets (CSS sets). A search space set is associated with a CORESET where the UE monitors PDCCH candidates for the search space set. A UE expects to monitor PDCCH candidates for up to 4 sizes of DCI formats that include up to 3 sizes of DCI formats with CRC scrambled by C-RNTI or MCS-C-RNTI per serving cell. The UE can count a number of sizes for DCI formats per serving cell based on a number of configured PDCCH candidates in respective search space sets for the corresponding active DL BWP.

For a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are given by Equation (1), below. As described in Equation (1), for any CSS, $Y_{p,n_{s,f}^{\mu}}=0$. Similar, for a USS, $Y_{p,n_{s,f}^{\mu}}=(A_p \cdot Y_{p,n_{s,f}^{\mu}-1})\mod D$, $Y_{p,-1}=n_{RNTI}\neq 0$, $A_p=39827$ for p mod 3=0, $A_p=39829$ for p mod 3=1, $A_p=39839$ for p mod 3=2, and D=65537. Additionally, as described in Equation (1), i=0, . . . , L−1, and $N_{CCE,p}$ is a number of CCEs, numbered from 0 to $N_{CCE,p}-1$, in CORESET p. Similar, $n_{CI}$ is a carrier indicator field value if the UE is configured with a carrier indicator field for the serving cell on which PDCCH is monitored; otherwise, including for any CSS, $n_{CI}=0$. The expression $m_{s,n_{CI}}$ as described in Equation (1), illustrates that $m_{s,n_{CI}}=0, \ldots, M_{s,n_{CI}}^{(L)}-1$, where $M_{s,n_{CI}}^{(L)}$ the number of PDCCH candidates the UE is configured to monitor for aggregation level L of a search space set s for a serving cell corresponding to $n_{CI}$. For a USS, $M_{s,max}^{(L)}$ is the maximum of $M_{s,n_{CI}}^{(L)}$ over configured $n_{CI}$ values for a CCE aggregation level L of search space set s. Further, the RNTI value used for $n_{RNTI}$ is the C-RNTI.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i \quad (1)$$

In certain embodiments, a UE (such as the UE 116) monitors PDCCH according to a CSS for scheduling a PDSCH providing system information, random access response, or paging only on one cell that is referred to as primary cell. The UE transmits PUCCH only on the primary cell. In certain embodiments, the UE is configured as a primary secondary cell (PSCell) for PUCCH transmissions. When the UE is configured as a PSCell, the UE transmits PUCCH on the primary cell for a master/primary cell group and transmits PUCCH on the PSCell for a secondary cell group. For brevity, the embodiments descriptions of this disclosure considers the primary cell, but the embodiments can be directly extended to a PSCell.

In response to PDSCH receptions or semi-persistent scheduling (SPS) PDSCH releases or a detection of a DCI format indicating dormancy/non-dormancy behavior for an SCell (monitoring/not monitoring PDCCH for scheduling on the SCell), the reports HARQ-ACK information that the UE generates according to a Type-1 HARQ-ACK codebook or a Type-2 HARQ-ACK codebook. For brevity, only PDSCH receptions are referred to in the following examples.

When a first PDSCH reception on a cell can be scheduled by a first DCI format provided by a first PDCCH that is received in a first CORESET from a first set of CORESETs for which the UE is not provided higher layer parameter CORESETPoolIndex or is provided CORESETPoolIndex with value 0 and/or a second PDSCH reception on a cell can be scheduled by a second DCI format provided by a second PDCCH that is received in a second CORESET from a second set of CORESETs for which the UE is provided CORESETPoolIndex with value 1, the UE generates HARQ-ACK information for the first PDSCH reception according to a first HARQ-ACK codebook and generates HARQ-ACK information for the second PDSCH reception according to a second HARQ-ACK codebook. The UE can be configured by higher layers to jointly code and multiplex the first and second HARQ-ACK codebooks in a same PUCCH or to separately code and multiplex the first and second HARQ-ACK codebooks in respective first and second PUCCHs.

In certain embodiments, a UE can also receive a first PDSCH that provides a TB using a first TCI state and a second PDSCH that provides the TB using a second TCI state. Here, the first and second PDSCH receptions are scheduled by a single DCI format and a TCI state field in the DCI format indicates the first TCI state and the second TCI state. The UE can generate a single HARQ-ACK information for the TB provided by the first PDSCH reception and by the second PDSCH reception.

For example, for a Type-1 HARQ-ACK codebook is generated, if a UE is (i) not provided CORESETPoolIndex or is provided CORESETPoolIndex with a value of 0 for first CORESETs on active DL BWPs of serving cells, (ii) provided CORESETPoolIndex with a value of 1 for second CORESETs on active DL BWPs of the serving cells, and (iii) provided ACKNACKFeedbackMode=JointFeedback. In this example, a serving cell is placed in a first set $S_0$ of $N_{cells}^{DL,0}$ serving cells if the serving cell includes a first CORESET. Similar, a serving cell is placed in a second set $S_1$ of $N_{cells}^{DL,1}$ serving cells if the serving cell includes a second CORESET. Additionally, serving cells are placed in a set according to an ascending order of a serving cell index. That is, the UE generates a Type-1 HARQ-ACK codebook for the set $S_0$ and the set $S_1$ of serving cells separately and concatenates the HARQ-ACK codebook generated for the set $S_0$ followed by the HARQ-ACK codebook generated for the set $S_1$ to obtain a total number of $O_{ACK}$ HARQ-ACK information bits.

In certain embodiments, a UE configured with DRX mode operation, is configured to monitor PDCCH on a primary cell outside Active Time for detection of a DCI format, referred to as DCI format 2_6, and a location of a Wake-up indication bit in DCI format 2_6. A '0' value for the Wake-up indication bit, when reported to higher layers, indicates to not start the drx-onDurationTimer for the next long DRX cycle and a '1' value for the Wake-up indication bit, when reported to higher layers, indicates to start the drx-onDurationTimer for the next long DRX cycle. When the UE is configured search space sets to monitor PDCCH for detection of a DCI format 2_6 and the UE fails to detect the DCI format 2_6, the UE behavior for whether or not the UE starts the drx-onDurationTimer for the next DRX cycle on the primary cell can be configured by higher layers (to start the drx-onDurationTimer or to not start the drx-onDurationTimer). The drx-onDurationTimer is the duration at the beginning of a DRX cycle.

In certain embodiments, the UE is configured in DCI format 2_6 a bitmap for corresponding groups of configured SCells where a '0' value for a bit of the bitmap indicates an active DL BWP that is a dormant BWP for the UE for each activated SCell in the corresponding group of configured SCells and a '1' value for a bit of the bitmap indicates an active (non-dormant) DL BWP for the UE for each activated SCell in the corresponding group of configured SCells, if a current active DL BWP is the dormant DL BWP, or a current active DL BWP for the UE for each activated SCell in the corresponding group of configured SCells if the current active DL BWP is not the dormant DL BWP. The UE does not monitor PDCCH in the dormant BWP of an SCell. When a UE detects DCI format 2_6, the physical layer of a UE reports the value of the Wake-up indication bit for the UE to higher layers for the next long DRX cycle; otherwise, it does not. The UE can also be indicated to change an active DL BWP to a dormant BWP or to a non-dormant BWP by a DCI format scheduling PDSCH reception on the primary cell and corresponding descriptions are omitted in this disclosure for brevity. An active DL BWP of a UE on a primary cell is not indicated to change to a dormant BWP.

At least for initial deployments, UEs using new radio (NR) radio access technology (NR UEs) coexist with legacy UEs using long-term evolution (LTE) radio access technology (LTE UEs) in a same network. To enable such coexistence in a same spectrum, dynamic spectrum sharing (DSS) is used where NR UEs and LTE UEs share a same channel and a network can dynamically allocate resources among LTE UEs and NR UEs. During certain time instances (slots for NR or subframes for LTE), a network may allocate most of the DL resources to LTE UEs while typically UL spectrum is not fully utilized and can be used for transmission from either NR UEs or LTE UEs. It is also possible that some DL spectrum can be available for PDSCH receptions by NR UEs. To enable such operation for NR UEs capable of carrier aggregation (CA) operation, the PDCCH receptions scheduling the PDSCH receptions on the first cell where LTE UEs and NR UEs coexist can be offloaded to a second cell, that typically also has a larger bandwidth, where only NR UEs exist. As the first cell is typically a macro-cell providing synchronization signals and broadcast system information, it is a primary cell, and the second cell can be denoted as a secondary cell. However, DSS operation can also be applicable among secondary cells.

In general, with DSS, an NR UE can be scheduled on a scheduled cell either from a first scheduling cell, such as a primary cell, or from a second scheduling cell such as an SCell. It is noted that unless otherwise explicitly mentioned, the term UE, as used in this disclosure refers to a NR UE.

Therefore, embodiments of the present disclosure take into consideration that there is a need to define a scheduling procedure for a UE that can be scheduled PDSCH receptions or PUSCH transmissions on a scheduled cell based on PDCCH receptions from a first scheduling cell or from a second scheduling cell.

Embodiments of the present disclosure also take into consideration that there is a need to define a wake-up procedure for a UE on a primary cell when the UE can be scheduled PDSCH receptions or PUSCH transmissions on the primary cell based on PDCCH receptions from a primary cell or from a secondary cell.

Embodiments of the present disclosure further take into consideration that there is a need to define a UE procedure for changing an active DL BWP to a dormant BWP on a secondary cell when the UE can be scheduled on a primary cell from the secondary cell.

Additionally, embodiments of the present disclosure take into consideration that there is a need to define a HARQ-ACK reporting procedure for a UE that can be scheduled PDSCH receptions on a scheduled cell based on PDCCH receptions on a first scheduling cell or on a second scheduling cell.

Accordingly, embodiments of the present disclosure relate to defining a scheduling procedures for a UE that can be scheduled PDSCH receptions or PUSCH transmissions on a scheduled cell based on PDCCH receptions from a first scheduling cell or from a second scheduling cell. The present disclosure further relates to defining a wake-up procedure for a UE on a primary cell when the UE can schedule PDSCH receptions or PUSCH transmissions on the primary cell based on PDCCH receptions from either the primary cell or from a secondary cell. Additionally, the present disclosure relates to defining a HARQ-ACK reporting procedure for a UE that can schedule PDSCH receptions on a first cell based on PDCCH receptions on the first cell or on a second cell.

Embodiments of the present disclosure describe partitioning of a UE PDCCH monitoring capability for scheduling on a scheduled cell from either a first scheduling cell or a second scheduling cell. The following examples and embodiments describe partitioning a UE PDCCH monitoring capability for scheduling on a scheduled cell from a first scheduling cell or from a second scheduling cell.

An embodiment of this disclosure considers partitioning for a PDCCH monitoring capability of a UE when PDSCH receptions or PUSCH transmissions from the UE on a cell can be scheduled from a first scheduling cell or a second scheduling cell. The scheduled cell can be same as or different than the first scheduling cell or the second scheduling cell and the first and second scheduling cells are different. The cell is a scheduled cell and the first and second cells are scheduling cells. For brevity, when referring to a UE that is scheduled on a cell, the scheduling includes scheduling of PDSCH receptions by or PUSCH transmissions from the UE, or activation or deactivation of semi-persistently scheduled PDSCH receptions by or PUSCH transmissions from the UE (with parameters configured by higher layers) using a DCI format with CRC scrambled by C-RNTI, CS-RNTI, or MCS-C-RNTI.

When a UE (such as the UE 116) is scheduled on a cell from a first scheduling cell or a second scheduling cell (UE is configured search space sets on the first cell and on the second cell for scheduling on the cell) without any restrictions in time, the cell is a scheduled cell for both the first scheduling cell and the second scheduling cell. If the first scheduling cell and the second scheduling cell use a same SCS configuration $\mu$ for PDCCH receptions in respective active DL BWPs for the UE, and for CORESETs associated with search space sets configured to the UE for monitoring PDCCH for scheduling on the cell, the scheduled cell is either counted or not counted based on the following examples.

For example, the scheduled cell is counted twice in the number of $N_{cells,0}^{DL,\mu}$ cells if the UE is not provided a CORESETPoolIndex value or is provided CORESETPoolIndex value 0 for at least one CORESET on both the first scheduling cell and the second scheduling cell. For another example, the scheduled cell is counted twice in the number of $N_{cells,0}^{DL,\mu}$ cells if the UE is provided CORESETPoolIndex value 1 for at least one CORESET on both the first scheduling cell and the scheduling second cell. For another example, the scheduled cell is counted once in the number of $N_{cells,0}^{DL,\mu}$ cells the UE is not provided a CORESETPoolIndex value or is provided only CORESETPoolIndex value 0 for all CORESETs only on one of the first scheduling cell or the second scheduling cell. For another example, the scheduled cell is counted once in the number of $N_{cells,1}^{DL,\mu}$ cells UE is provided only CORESETPoolIndex value 1 for all CORESETs only on one of the first scheduling cell or the second scheduling cell. For another example, the scheduled cell is not counted in the number of $N_{cells,0}^{DL,\mu}$ cells if the UE is provided only CORESETPoolIndex value 1 for all CORESETs on both the first scheduling cell and the second scheduling cell. For yet another example, the scheduled cell is not counted in the number of $N_{cells,1}^{DL,\mu}$ cells if the UE is not provided a CORESETPoolIndex value or is provided only CORESETPoolIndex value 0 for all CORESETs on both the first scheduling cell and the second scheduling cell.

For instance, for CORESETs associated with search space sets where the UE monitors PDCCH for scheduling on the scheduled cell, if the UE is not provided a CORESETPoolIndex value for all CORESETs on both the first scheduling cell and the second scheduling cell, the scheduled cell is counted twice in $N_{cells,0}^{DL,\mu}$, that $N_{cells,0}^{DL,\mu} = N_{cells,0}^{DL,\mu}+1$, and is not counted in $N_{cells,1}^{DL,\mu}$. For another instance, if the UE is not provided a CORESETPoolIndex value on the first scheduling cell and is not provided a CORESETPoolIndex value or is provided CORESETPoolIndex value 0 for first CORESETs on the second scheduling cell and is provided CORESETPoolIndex value 1 for second CORESETs on the second scheduling cell, the scheduled cell is counted twice in $N_{cells,0}^{DL,\mu}$ and is counted once in $N_{cells,1}^{DL,\mu}$. For yet another instance, if the UE is not provided a CORESETPoolIndex value or is provided CORESETPoolIndex value 0 for first CORESETs on the first scheduling cell and is provided CORESETPoolIndex value 1 for second CORESETs on the first scheduling cell and the UE is provided CORESETPoolIndex value 0 for first CORESETs on the second scheduling cell and is provided CORESETPoolIndex value 1 for second CORESETs on the second scheduling cell, the scheduled cell is counted twice in $N_{cells,0}^{DL,\mu}$ and is counted twice in $N_{cells,1}^{DL,\mu}$.

Figure 10:
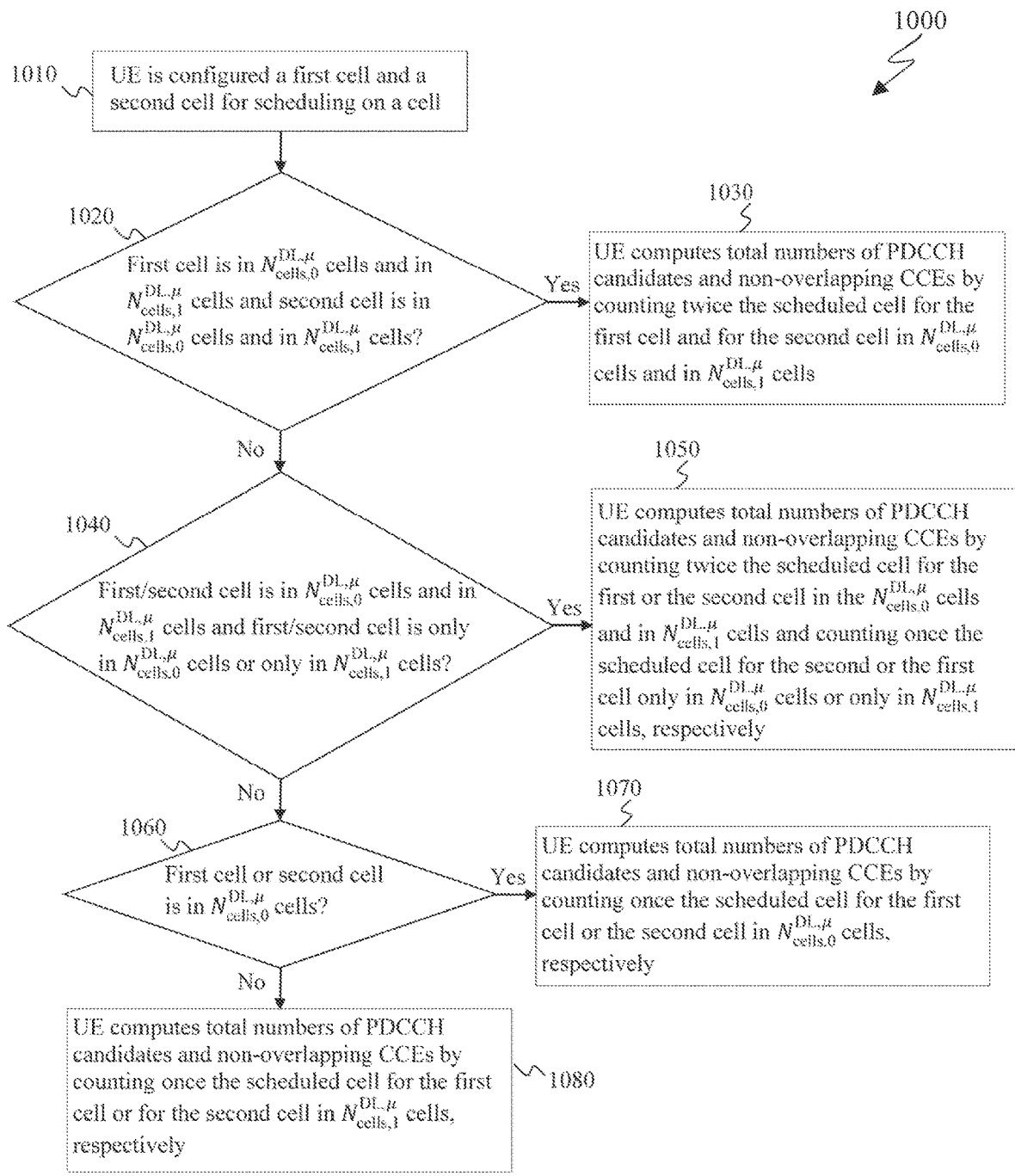
FIG. 10 illustrates a method for a UE to determine a total number of physical downlink control channel (PDCCH) candidates and a total number of non-overlapping control channel elements (CCEs) according to embodiments of the present disclosure.

FIG. 10 illustrates a method 1000 of a UE with a cell scheduled from a first scheduling cell and a second scheduling cell that have a same subcarrier spacing (SCS) configuration for an active down link (DL) bandwidth part (BWP) to determine a total number of physical downlink control channel (PDCCH) candidates and a total number of non-overlapping control channel elements (CCEs) according to embodiments of the present disclosure. For example, the steps of the method 1000 can be performed by any of the UEs 111-116 of FIG. 1, such as the UE 116 of FIG. 3. The method 1000 of FIG. 10 is for illustration only and other embodiments can be used without departing from the scope of the present disclosure.

As illustrated in FIG. 10, the method 1000 describes an example procedure for a UE with a cell scheduled from a first scheduling cell and a second scheduling cell that have a same SCS configuration µ for an active DL BWP to determine a total number of PDCCH candidates and a total number of non-overlapping CCEs according to this disclosure.

A UE is configured a first scheduling cell and a second scheduling cell for scheduling on a scheduled cell 1010. The UE determines, in step 1020, whether a first condition that the first scheduling cell is in a first set of $N_{cells,0}^{DL,\mu}$ cells and in a second set of $N_{cells,1}^{DL,\mu}$ cells and the second scheduling cell is in the first set of $N_{cells,0}^{DL,\mu}$ cells and in the second set of $N_{cells,1}^{DL,\mu}$ cells is valid. When the first condition (of step 1020) is valid, the UE, in step 1030, computes a total number of PDCCH candidates $M_{PDCCH}^{total,slot,\mu}$ and a total number of non-overlapping CCEs $C_{PDCCH}^{total,slot,\mu}$ for SCS configuration µ by counting twice the scheduled cell for first scheduling cell and for the second scheduling cell, in the first set of $N_{cells,0}^{DL,\mu}$ cells and in the second set of $N_{cells,1}^{DL,\mu}$ cells.

When the first condition (of step 1020) is not valid, the UE, in step 1040, determines whether a second condition that the first or second scheduling cell is in a first set of $N_{cells,0}^{DL,\mu}$ cells and in a second set of $N_{cells,1}^{DL,\mu}$ cells and the second or first scheduling cell is only in the first set of $N_{cells,0}^{DL,\mu}$ cells or only in the second set of $N_{cells,1}^{DL,\mu}$ cells, respectively, is valid. When the second condition (of step 1040) is valid, the UE, in step 1050, computes a total number of PDCCH candidates and a total number of non-overlapping CCEs for SCS configuration µ by counting twice the scheduled cell for the first or the second scheduling cell in the first set of $N_{cells,0}^{DL,\mu}$ cells and in the second set of $N_{cells,1}^{DL,\mu}$ cells and counting once the scheduled cell for the second or the first scheduling cell only in the first set of $N_{cells,0}^{DL,\mu}$ cells or only in the second set of $N_{cells,0}^{DL,\mu}$ cells, respectively.

When the second condition (of step 1040) is not valid, the UE, in step 1060, determines whether the first scheduling cell or the second scheduling cell is in the first set of $N_{cells,0}^{DL,\mu}$ cells 1060. When the first scheduling cell or the second scheduling cell is in the first set of $N_{cells,0}^{DL,\mu}$ cells, respectively, the UE, in step 1070, computes a total number of PDCCH candidates and a total number of non-overlapping CCEs for SCS configuration µ by counting once the scheduled cell for the first scheduling cell or the second scheduling cell in the first set of $N_{cells,0}^{DL,\mu}$ cells, respectively. Alternatively, the UE counts, in step 1080, once the scheduled cell for the first scheduling cell or for the second scheduling cell, respectively, in the second set of $N_{cells,1}^{DL,\mu}$ cells. It is also possible that if a scheduling cell is only in one set of cells, the one set of cells is the first set of $N_{cells,0}^{DL,\mu}$ cells and then the UE does not perform the steps after step 1050 and counts the scheduled cell once in the first set of $N_{cells,0}^{DL,\mu}$ cells.

If the first scheduling cell and the second scheduling cell use a different SCS configuration µ for PDCCH receptions in respective active DL BWPs for the UE, and for CORESETs associated with search space sets configured to the UE for monitoring PDCCH for scheduling on the scheduled cell, the scheduled cell is counted for determining a value of $M_{PDCCH}^{total,slot,\mu}$ and a value of $C_{PDCCH}^{total,slot,\mu}$ on both the first scheduling cell and the second scheduling cell where the counting on the first scheduling cell is as in the case the UE is not scheduled on the scheduled cell from the second scheduling cell and the counting on the second scheduling cell is as in the case the UE is not scheduled on the scheduled cell from the first scheduling cell.

Counting a scheduled cell for the determination of $M_{PDCCH}^{total,slot,\mu}$ and $C_{PDCCH}^{total,slot,\mu}$ for both a first scheduling cell and a second scheduling cell penalizes a PDCCH monitoring capability for other scheduled cells that have only one scheduling cell as PDCCH candidates to a scheduled cell having more than one scheduling cell need to exist on the more than one scheduling cells.

In a first approach to avoid penalizing scheduled cells with one scheduling cell, a UE PDCCH monitoring capability allocated to such a scheduled cell is counted only once. For example, if the scheduled cell and a scheduling cell can be a same cell, the cell is included in $N_{cells,0}^{DL,\mu}$ and/or $N_{cells,1}^{DL,\mu}$ only for itself as a scheduling cell (e.g. CIF value is 0) and is not included in $N_{cells,0}^{DL,\mu}$ and/or $N_{cells,1}^{DL,\mu}$ for the scheduling cell that is not same as the scheduled cell (CIF value is not 0). For example, if the scheduled cell and any scheduling cell are not a same cell, the cell is included in $N_{cells,0}^{DL,\mu}$ and/or $N_{cells,1}^{DL,\mu}$ only for a scheduling cell with the smallest cell index and is not included in $N_{cells,0}^{DL,\mu}$ and/or $N_{cells,1}^{DL,\mu}$ for scheduling cells with larger indexes.

In a second approach, a time pattern can be introduced for when the cell can be scheduled from the first cell or from the second cell. The time pattern can be a pattern of slots and can be determined by the UE based on a configuration of search space sets for the scheduled cell, or provided to UE by higher layers when the configuration of search space sets for the scheduled cell results to PDCCH monitoring from both scheduling cells in a same slot. The pattern of slots can have a predetermined or configured duration, such as 10 slots or 40 slots, or 10 msec or 40 msec. In the latter case, a number of slots can be derived by multiplying the duration by the number of slots per msec as determined by the SCS configuration p. For example, for a time pattern of 10 slots, a UE can determine based on the configuration of search space sets for the scheduled cell, or be provided by higher layers, a bitmap of 10 bits, having a one-to-one mapping to the 10 slots, where a bit value of '0' indicates that the cell can be scheduled only from a first scheduling cell in a corresponding slot and a bit value of '1' indicates that the cell can be scheduled only from a second scheduling cell in the corresponding slot. Then, for the determination of a total number of PDCCH candidates $M_{PDCCH}^{total,slot,\mu}$ and of a total number of non-overlapping CCEs $C_{PDCCH}^{total,slot,\mu}$ in a slot, the UE determines $N_{cells,0}^{DL,\mu}$ and/or $N_{cells,1}^{DL,\mu}$ by associating the scheduled cell with the first scheduling cell when a corresponding bitmap value is '0' where μ is an SCS configuration of an active DL BWP in the first scheduling cell, and determines $N_{cells,0}^{DL,\mu}$ and/or $N_{cells,1}^{DL,\mu}$ by associating the scheduled cell with the second scheduling cell when a corresponding bitmap value is '1' where μ is an SCS configuration of an active DL BWP in the second scheduling cell.

Figure 11:
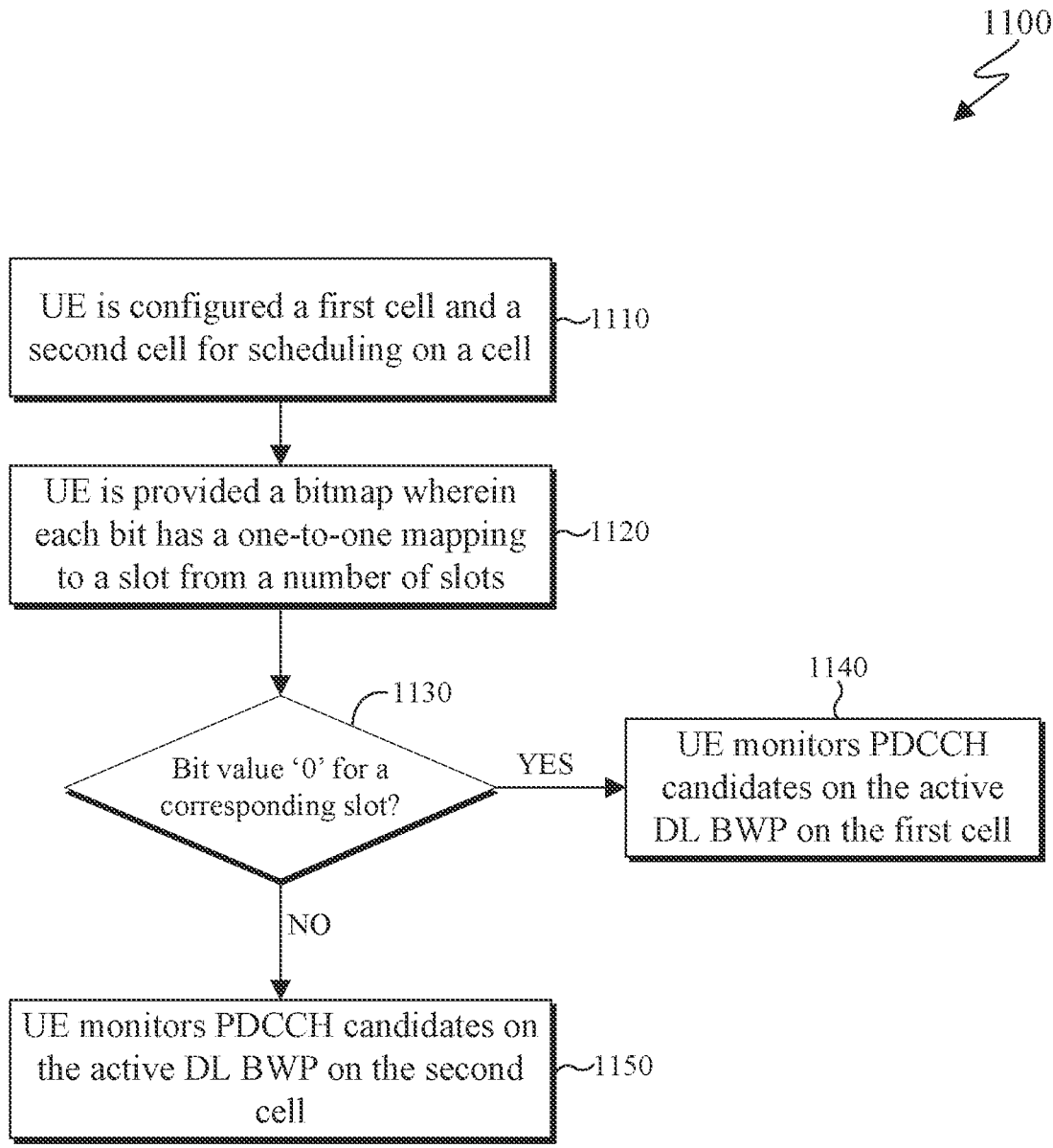
FIG. 11 illustrates a method for a UE to be schedule on a cell from a first cell and a second cell based on a time pattern according to embodiments of the present disclosure.

FIG. 11 illustrates a method 1100 for a UE to be schedule on a cell from a first cell and a second cell based on a time pattern according to embodiments of the present disclosure. For example, the steps of the method 1100 can be performed by any of the UEs 111-116 of FIG. 1, such as the UE 116 of FIG. 3. The method 1100 of FIG. 11 is for illustration only and other embodiments can be used without departing from the scope of the present disclosure.

As illustrated in FIG. 11, step 1110, describes a UE that is configured a first cell and a second cell for scheduling on a cell. In step 1120, the UE determines based on the search space sets for the cell, or is provided by higher layers, a bitmap wherein each bit of the bitmap has a one-to-one mapping to a slot from a number of slots wherein the number of slots is equal to the size of the bitmap. The size of the bitmap and the number of slots can be predetermined in the system operation or provided to the UE by higher layers. For a given slot, the UE, in step 1130, determines whether a corresponding bit in the bitmap has value '0'. When the UE determines that bit has value '0', the UE, in step 1140, monitors PDCCH candidates according to search space sets on the active DL BWP of the first cell. When the UE determines that the bit has value '1', the UE, in step 1150, monitors PDCCH candidates according to search space sets on the active DL BWP of the second cell.

Although FIGS. 10 and 11 illustrate the methods 1000 and 1100, various changes may be made to FIGS. 10 and 11. For example, while the method 1000 of FIG. 10 and the method 1100 of FIG. 11 are shown as a series of steps, various steps could overlap, occur in parallel, occur in a different order, or occur multiple times. In another example, steps may be omitted or replaced by other steps. For example, steps of the method 1100 can be executed in a different order.

Embodiments of the present disclosure also describe a UE behavior in response to variations in conditions for monitoring PDCCH on scheduling cells. The following examples and embodiments describe UE behavior in response to variations in conditions for monitoring PDCCH on scheduling cells.

When a scheduled cell is a primary cell, or a primary SCell (PSCell) where a UE transmits PUCCH, and the primary cell is scheduled from an SCell, the UE does not expect to receive an indication to deactivate the SCell (for example by a MAC control element). Similar, to enable dynamic scheduling of the primary cell from either the primary cell or from the SCell in a slot, the UE does not change an active DL BWP on the SCell to a dormant BWP on the SCell where the UE does not monitor PDCCH even when the SCell is included in a group of SCells for which the UE receives an indication to change an active DL BWP to a dormant DL BWP. A dormant DL BWP on a cell in a BWP where a UE does not monitor PDCCH. The UE behavior can additionally be conditioned on a drx-onDurationTimer for the UE on the primary cell having started; otherwise, the UE behavior can be to follow an indication to deactivate the SCell or to change an active DL BWP on the SCell to the dormant BWP on the SCell. Similar to the SCell deactivation, it is also possible that the UE does not expect to be configured the SCell to be part of an SCell group for which the UE can receive an indication to change an active DL BWP to a dormant BWP.

Figure 12:
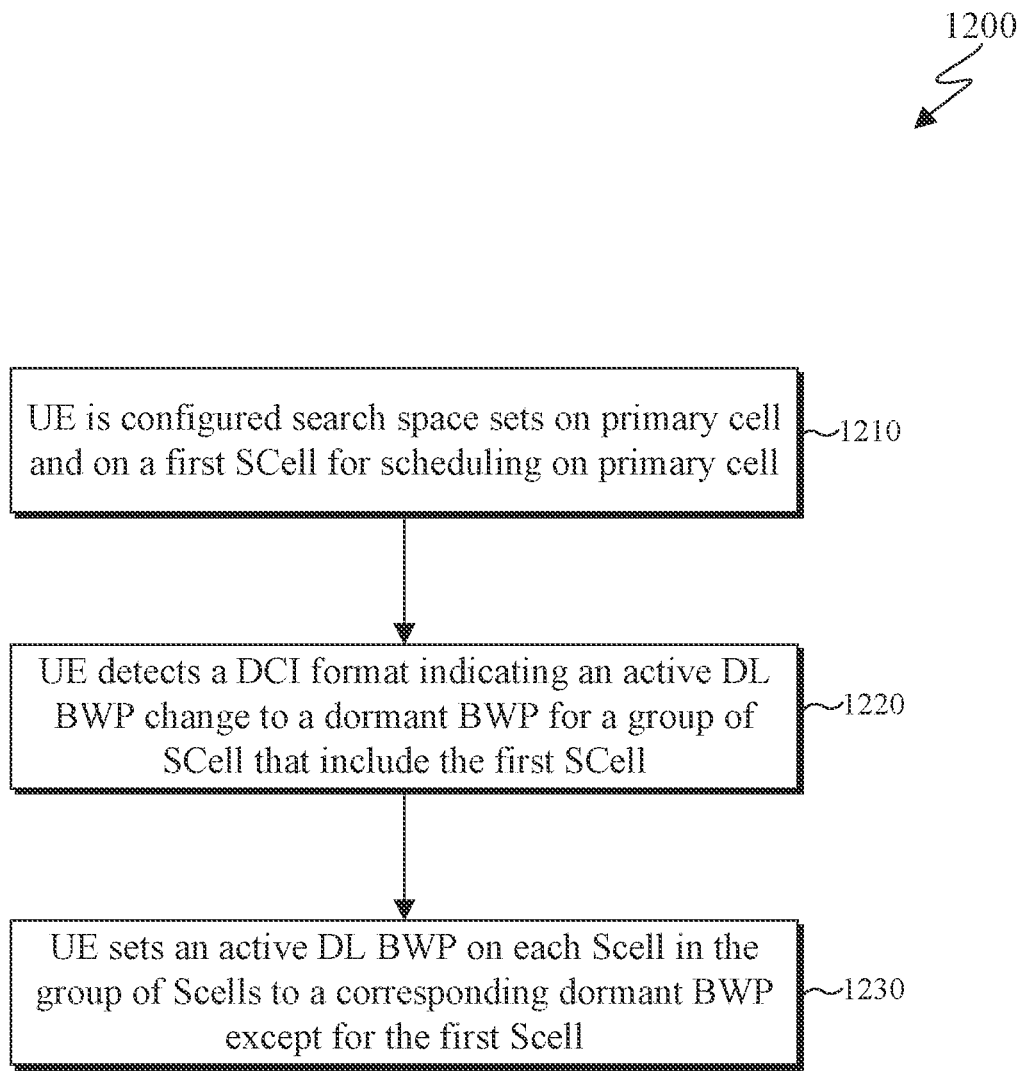
FIG. 12 illustrates a method for determining an active DL BWP change to a dormant BWP on a secondary cell according to embodiments of the present disclosure.

FIG. 12 illustrates a method 1200 for determining an active DL BWP change to a dormant BWP on a secondary cell according to embodiments of the present disclosure. For example, the steps of the method 1200 can be performed by any of the UEs 111-116 of FIG. 1, such as the UE 116 of FIG. 3. The method 1200 of FIG. 12 is for illustration only and other embodiments can be used without departing from the scope of the present disclosure.

As illustrated in FIG. 12, the method 1200 describes an example procedure for a UE to determine an active DL BWP change to a dormant BWP on a secondary cell according to this disclosure. In step 1210, a UE is configured search space sets on the primary cell and on a first SCell for scheduling on the primary cell. In step 1220, the UE detects a DCI format that includes an indication for an active DL BWP change to a dormant BWP for a group of SCells that include the SCell. In step 1230, the UE sets an active DL BWP on each SCell in the group of SCells to a corresponding dormant BWP except for the first SCell where the active DL BWP remains unchanged, and the UE continues to monitor PDCCH according to respective search space sets. It is noted that an exception can be for the case that the drx-onDurationTimer on the primary cell is not running in which case the UE can change an active DL BWP to a dormant BWP on the first SCell when the UE receives a corresponding indication by a DCI format.

When a scheduled cell is a primary cell, or a primary SCell (PSCell), and a UE (such as the UE 116) is indicated by a DCI format 2_6 to not start a drx-onDurationTimer for a next DRX cycle on the primary cell, or when the UE does not detect the DCI format 2_6, the UE behavior is to not start the drx-onDurationTimer for the next DRX cycle on the primary cell, and the primary cell is scheduled from an SCell, the UE does not monitor PDCCH on the SCell for scheduling on the primary cell during the next DRX cycle on the primary cell. This can be beneficial for UE power savings or for a better utilization of a PDCCH monitoring capability as a serving gNB does not intend to schedule the UE on the primary cell.

Further, the UE can consider an indication by the DCI format 2_6 to be applicable for both the primary cell and the SCell. In such case, the UE does not monitor PDCCH for scheduling on the SCell. Additionally, when the DRX cycles on the primary cell and the SCell are aligned, the UE does not start a drx-onDurationTimer on the SCell for the next DRX cycle on the SCell.

In general, a condition for scheduling on a cell from a first cell or from a second cell can be that corresponding DRX cycles on the first and second cells are aligned, and a UE can expect such alignment. Further, an indication to a UE to not start the drx-onDurationTimer for the next DRX cycle on the primary cell can also serve as an indication for the UE to change an active DL BWP on all SCells to a corresponding dormant BWP or to deactivate all SCells. The DRX cycle can be a long DRX cycle or a short DRX cycle.

When a UE is configured search space sets on both the primary cell and an SCell for scheduling on the primary cell, the UE can also be configured search space sets to monitor PDCCH for a detection of DCI format 2_6 on the SCell, in addition to corresponding search space sets on the primary cell. Otherwise, when the UE is scheduled on the primary cell only through PDCCH receptions according to search space sets on the primary cell, the UE can be configured search space sets only on the primary cell to monitor PDCCH for detection of DCI format 2_6.

Additionally, when a DRX cycle for a UE (such as the UE 116) on the primary cell is not identical with a DRX cycle for the UE on an SCell that is a scheduling cell for the primary cell, the UE does not monitor PDCCH on the SCell for scheduling on the primary cell when a drx-onDuration-Timer on the primary cell is not running.

Figure 13:
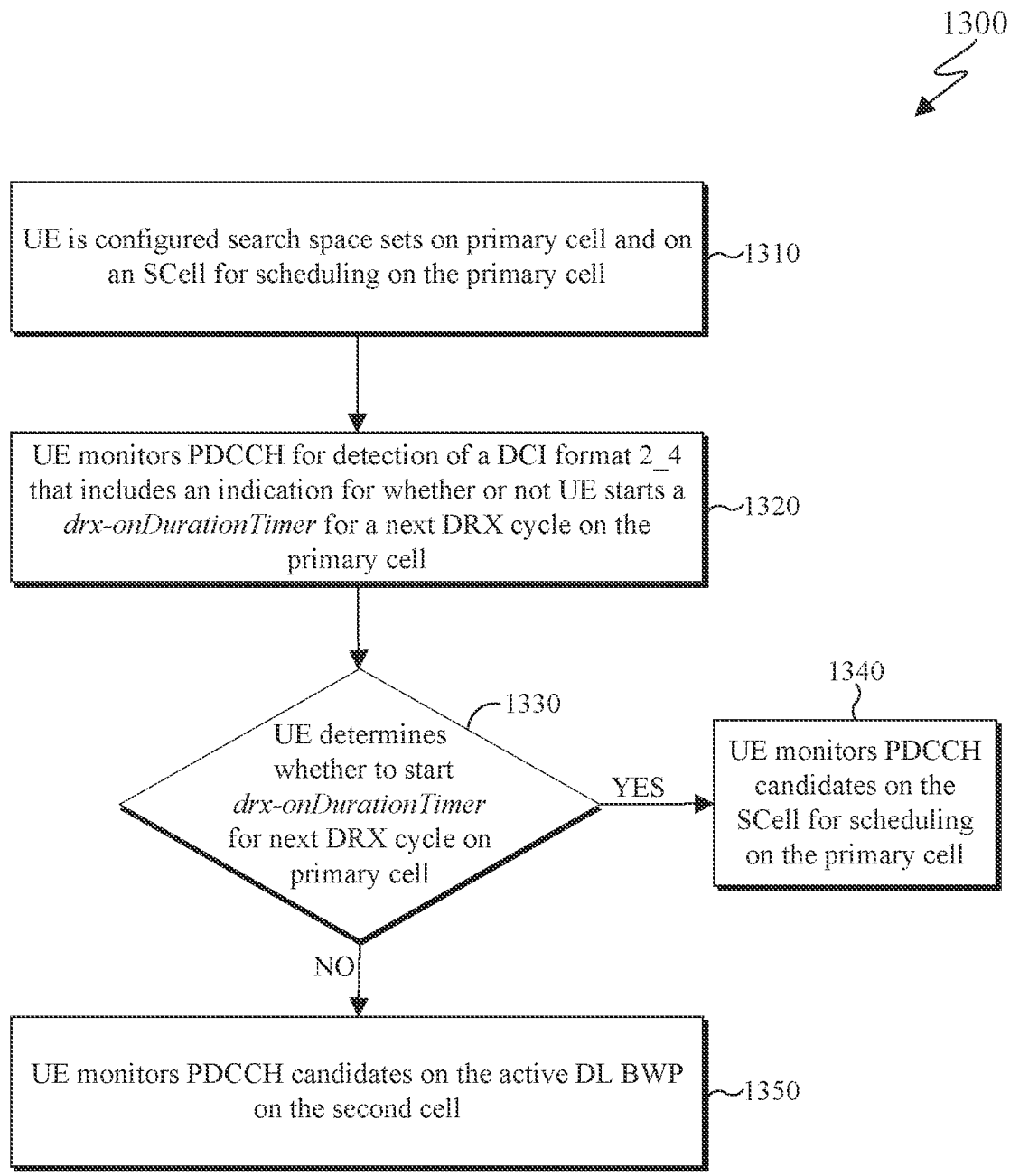
FIG. 13 illustrates a method for determining whether to monitor PDCCH on a secondary cell (SCell) for scheduling on a primary cell based on an indication by a DCI format according to embodiments of the present disclosure.

FIG. 13 illustrates a method 1300 for determining whether to monitor PDCCH on a secondary cell (SCell) for scheduling on a primary cell based on an indication by a DCI format according to embodiments of the present disclosure. For example, the steps of the method 1300 can be performed by any of the UEs 111-116 of FIG. 1, such as the UE 116 of FIG. 3. The method 1300 of FIG. 13 is for illustration only and other embodiments can be used without departing from the scope of the present disclosure.

As illustrated in FIG. 13, the method 1300 describes an example procedure for a UE to determine whether to monitor PDCCH on an SCell for scheduling on a primary cell based on an indication by a DCI format according to this disclosure.

In step 1310, a UE is configured search space sets on the primary cell and on a SCell for scheduling on the primary cell. In step 1320, the UE is also configured search space sets on the primary cell to monitor PDCCH for detection of a DCI format 2_6 wherein the DCI format 2_6 includes an indication to the UE for whether or not the UE starts a drx-onDurationTimer for a next DRX cycle on the primary cell.

Based on the indication or based on a configured UE behavior when the UE does not detect the DCI format 2_6, the UE determines, in step 1330, whether or not the UE starts the drx-onDurationTimer for the next DRX cycle on the primary cell. When the UE starts the drx-onDuration-Timer for the next DRX cycle on the primary cell (as determined in step 1330), the UE in step 1340, monitors PDCCH on the SCell for scheduling on the primary cell. When the UE does not start the drx-onDurationTimer for the next DRX cycle on the primary cell (as determined in step 1330), the UE, in step 1350, does monitor PDCCH on the SCell for scheduling on the primary cell.

It is also possible that the UE applies a same behavior for whether or not to start a respective drx-onDurationTimer for a next DRX cycle based on a DCI format 2_6 detection (or absence of detection) for both the primary cell and the SCell.

In certain embodiments, the UE behavior for PDCCH monitoring on the SCell for scheduling on the primary cell can also depend on an active DL BWP on the primary cell. For example, when the active DL BWP on the primary cell is not a default DL BWP (where the UE typically is indicated to transition to either by a DCI format or based on an expiration of a timer bwp-InactivityTimer), or an initial DL BWP when a default DL BWP is not provided, the UE monitors PDCCH on the SCell for scheduling on the primary cell based on respective search space sets. The UE resets the timer bwp-InactivityTimer for the scheduled cell when the UE detects a DCI format in a PDCCH reception on the first scheduling cell or the second scheduling cell that schedules a PDSCH reception or a PUSCH transmission on the scheduled cell. For another example, when the active DL BWP on the primary cell is the default DL BWP, then scheduling for the UE on the primary cell is typically less frequent and it can be detrimental for the UE to monitor PDCCH on the SCell for scheduling on the primary cell. For instance, due to additional UE power consumption or due to unnecessary use of the UE PDCCH monitoring capability.

In certain embodiments, the UE can stop monitoring PDCCH on the SCell for scheduling on the primary cell when the UE changes the active DL BWP on the primary cell to a default DL BWP and the UE can start monitoring PDCCH on the SCell for scheduling on the primary cell when the UE changes the active DL BWP on the primary cell from the default DL BWP to another DL BWP. Alternatively, the UE can switch from a first configuration of search space sets to a second configuration of search space sets for monitoring PDCCH on the SCell for scheduling on the primary cell or, in general on the scheduled cell, when the UE changes the active DL BWP on the primary cell to the default DL BWP or the initial DL BWP on the primary cell, and the reverse. It is also possible for the determination of the total number of PDCCH candidates or the total number of non-overlapping CCEs in a slot, as described in the first embodiment of this disclosure, for the UE to not count the primary cell twice in the number of $N_{cells,0}^{DL,\mu}$ and/or $N_{cells,1}^{DL,\mu}$.

Figure 14:
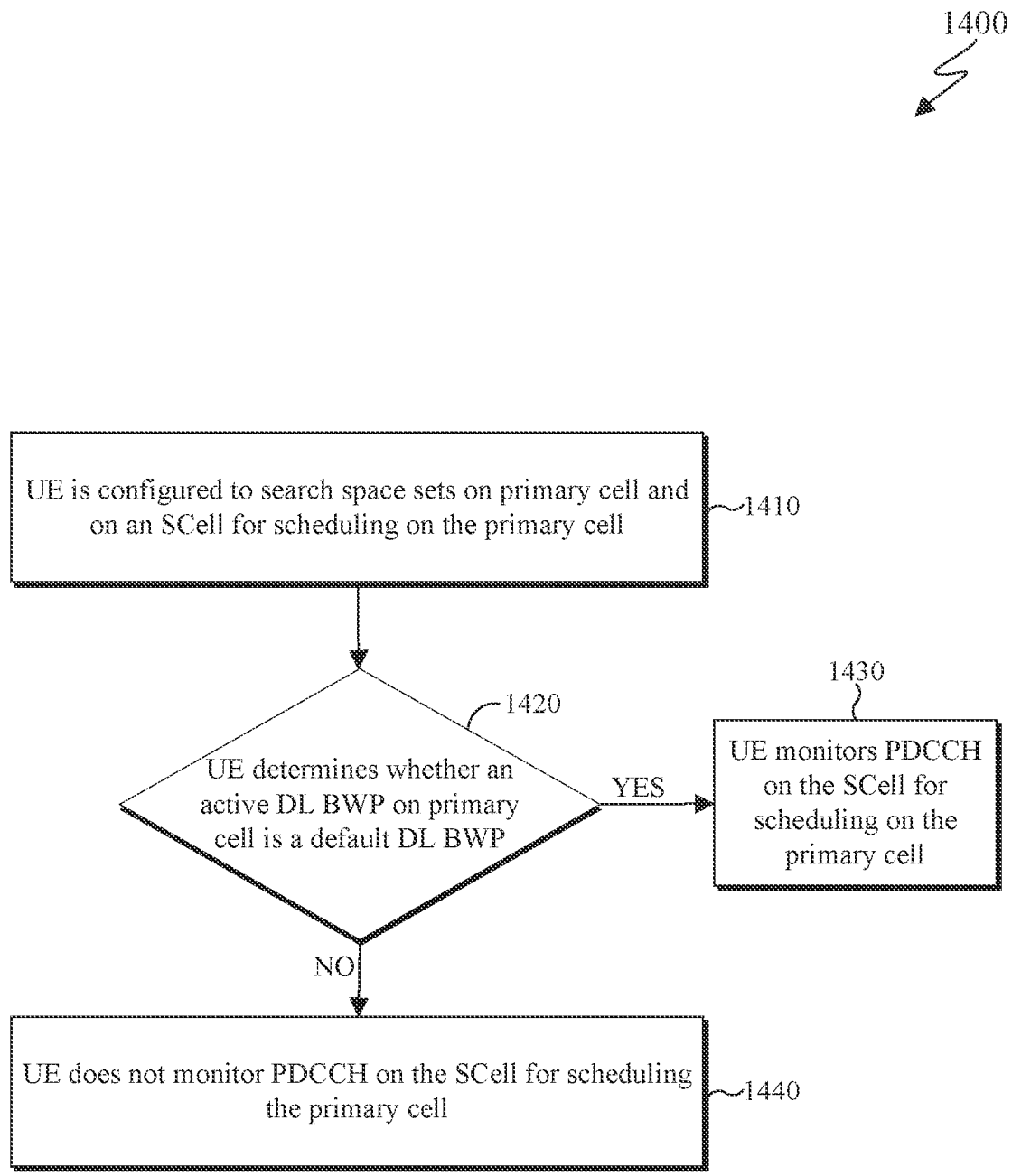
FIG. 14 illustrates a method for determining whether to monitor PDCCH on an SCell for scheduling on a primary cell based on an active DL BWP on the primary cell according to embodiments of the present disclosure.

FIG. 14 illustrates a method 1400 for determining whether to monitor PDCCH on an SCell for scheduling on a primary cell based on an active DL BWP on the primary cell according to embodiments of the present disclosure. For example, the steps of the method 1400 can be performed by any of the UEs 111-116 of FIG. 1, such as the UE 116 of FIG. 3. The method 1400 of FIG. 14 is for illustration only and other embodiments can be used without departing from the scope of the present disclosure.

As illustrated in FIG. 14, the method 1400 describes an example procedure for a UE to determine whether to monitor PDCCH on an SCell for scheduling on a primary cell based on an active DL BWP on the primary cell according to this disclosure In step 1410, a UE is configured search space sets on the primary cell and on a SCell for scheduling on the primary cell. In step 1420 the UE determines whether an active DL BWP on the primary cell is a default DL BWP (or an initial DL BWP). When the active DL BWP on the primary cell is the default DL BWP (as determined in step 1420), the UE, in step 1430, the UE monitors PDCCH, or monitors PDCCH according to a second configuration of search space sets, on the SCell for scheduling on the primary cell. Otherwise, when the active DL BWP on the primary cell is not the default DL BWP (as determined in step 1420), the UE, in step 1440, does not monitor PDCCH, or monitors PDCCH according to a first configuration of search space sets, on the SCell for scheduling on the primary cell.

Although FIG. 12 illustrates the method 1200, FIG. 13 illustrates the method 1300, and FIG. 14 illustrates the method 1400, various changes may be made to these FIGURES. For example, while the method 1200 of FIG. 12, the method 1300 of FIG. 13, and the method 1400 of FIG. 14 is shown as a series of steps, various steps could overlap, occur in parallel, occur in a different order, or occur multiple times. In another example, steps may be omitted or replaced by other steps. For example, steps of the method 1400 can be executed in a different order.

Embodiments of the present disclosure also describe UE procedures for reporting HARQ-ACK information when a scheduled cell has more than one scheduling cells. The following examples and embodiments describe procedures for a UE for reporting HARQ-ACK information when a scheduled cell has more than one scheduling cells.

In certain embodiments, the Type-1 HARQ-ACK codebook does not depend on PDCCH receptions by a UE and should therefore be independent of whether a PDSCH reception on a cell is scheduled by a first PDCCH reception on a first scheduling cell or by a second PDCCH reception on a second scheduling cell.

In certain embodiments, the UE (such as the UE 116) generates the Type-1 HARQ-ACK codebook assuming that scheduling is always from the first scheduling cell in order to avoid any ambiguity in the contents of the Type-1 HARQ-ACK codebook, when the first scheduling cell is same as the scheduled cell and the UE is (i) not provided CORESETPoolIndex or is provided CORESETPoolIndex with a value of 0 for first CORESETs on the active DL BWP of the first scheduling cell, (ii) provided CORESETPoolIndex with a value of 1 for second CORESETs on active DL BWPs of the first scheduling cell, and (iii) not provided CORESETPoolIndex or is provided CORESETPoolIndex with a value of 0 for all CORESETs on the active DL BWP of the second scheduling cell, or (iv) is provided CORESETPoolIndex with a value of 1 for all CORESETs on the active DL BWPs of the second scheduling cell.

The UE generates the Type-1 HARQ-ACK codebook for the set $S_0$ and the set $S_1$ of the first scheduling cell separately and concatenates the HARQ-ACK codebook generated for the set $S_0$ followed by the HARQ-ACK codebook generated for the set $S_1$ to obtain a total number of $O_{ACK}$ HARQ-ACK information bits. If a UE can be scheduled on a cell from a first scheduling cell that is both in a first set $S_0$ of $N_{cells,0}^{DL,0}$ serving cells and in a second set $S_1$ of $N_{cells}^{DL,1}$ serving cells and from a second scheduling cell that is either in a first set $S_0$ of $N_{cells}^{DL,0}$ serving cells or in a second set $S_1$ of $N_{cells}^{DL,1}$ serving cells, then the UE generates for every slot assuming that scheduling is from the first scheduling cell.

Figure 15:
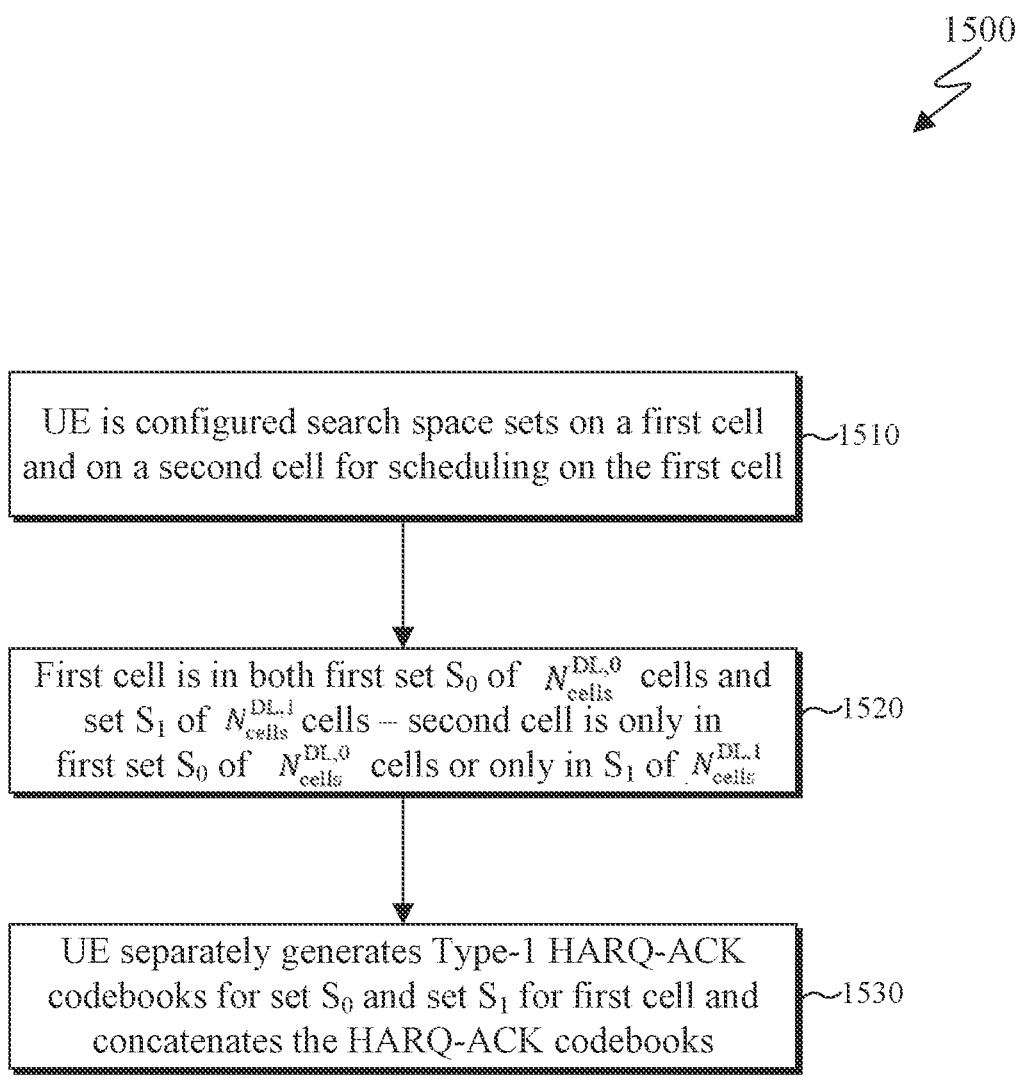
FIG. 15 illustrates a method for generating a Type-1 hybrid automatic repeat request acknowledgement (HARQ-ACK) codebook according to embodiments of the present disclosure.

FIG. 15 illustrates a method 1500 for generating a Type-1 hybrid automatic repeat request acknowledgement (HARQ-ACK) codebook according to embodiments of the present disclosure. For example, the steps of the method 1500 can be performed by any of the UEs 111-116 of FIG. 1, such as the UE 116 of FIG. 3. The method 1500 of FIG. 15 is for illustration only and other embodiments can be used without departing from the scope of the present disclosure.

As illustrated in FIG. 15, the method 1500 describes an example procedure for a UE to generate a Type-1 HARQ-ACK codebook depending on the configuration of CORESETs on a first cell and on a second cell that schedule a same cell according to this disclosure.

In step 1510, a UE (such as the UE 116) is configured search space sets on a first cell and on a second cell for scheduling on the first cell.

In step 1520, the UE determines that for the search space sets on the active DL BWP of the first cell, the UE (a) is not provided CORESETPoolIndex or is provided CORESETPoolIndex with a value of 0 for first CORESETs that associate the first cell with the first set $S_0$ of $N_{cells}^{DL,0}$ serving cells and (b) is provided CORESETPoolIndex with a value of 1 for second CORESETs that associate the first cell with the second set $S_1$ of $N_{cells}^{DL,1}$ serving cells. Similar, for the search space sets on the active DL BWP of the second cell, the UE is (a) either not provided CORESETPoolIndex or is provided CORESETPoolIndex with a value of 0 for first CORESETs that associate the second cell with the first set $S_0$ of $N_{cells}^{DL,0}$ serving cells, or (b) is provided CORESETPoolIndex with a value of 1 for second CORESETs associate the second cell with the second set $S_1$ of $N_{cells}^{DL,1}$ serving cells.

In step 1530, the UE separately generates a Type-1 HARQ-ACK codebook for the set $S_0$ and the set $S_1$ for the first scheduling cell and the UE concatenates the HARQ-ACK codebook generated for the set $S_0$ followed by the HARQ-ACK codebook generated for the set $S_1$ to obtain a total number of $O_{ACK}$ HARQ-ACK information bits.

For example, when the first scheduling cell is same as the scheduled cell and the UE is (i) not provided CORESETPoolIndex or is provided CORESETPoolIndex with a value of 0 for all CORESETs on the active DL BWP of the first scheduling cell, and (ii) provided CORESETPoolIndex with a value of 1 for all CORESETs on the active DL BWPs of the second scheduling cell the UE needs to generate the Type-1 HARQ-ACK codebook assuming that scheduling can be either from the first scheduling cell or from the second scheduling cell in order to avoid any ambiguity in the contents of the Type-1 HARQ-ACK codebook. The UE generates the Type-1 HARQ-ACK codebook for the set $S_0$ of the first scheduling cell and for the set $S_1$ of the second scheduling cell separately and concatenates the HARQ-ACK codebook generated for the set $S_0$ followed by the HARQ-ACK codebook generated for the set to obtain a total number of $O_{ACK}$ HARQ-ACK information bits. That is, if a UE can be scheduled on a cell from a first scheduling cell that is only in a first set $S_0$ of $N_{cells}^{DL,0}$ serving cells and from a second scheduling cell that is only in a second set $S_1$ of $N_{cells}^{DL,1}$ serving cells, the UE generates HARQ-ACK information for every slot assuming that scheduling is from both the first scheduling cell and the second scheduling cell. The same applies if the first scheduling cell is only in a second set $S_1$ of $N_{cells}^{DL,1}$ serving cells and the second scheduling cell that is only in a first set $S_0$ of $N_{cells}^{DL,0}$ serving cells.

Although FIG. 15 illustrates the method 1500 various changes may be made to FIG. 15. For example, while the method 1500 of FIG. 15 is shown as a series of steps, various steps could overlap, occur in parallel, occur in a different order, or occur multiple times. In another example, steps may be omitted or replaced by other steps. For example, steps of the method 1500 can be executed in a different order.

Embodiments of the present disclosure also relate to design of downlink control signaling from a base station according to variable scheduling latency requirements for a scheduled UE.

In certain embodiments, referring to Equation (1) above, the parameter $Y_{p,n_{s,f}^\mu}$ randomizes a first CCE of PDCCH candidates for a CCE aggregation level for a UE (such as the UE 116) based on the C-RNTI of the UE. Then, when the UE and other UEs have overlapping CCEs for some PDCCH candidates in a slot, the overlapping is not permanent across slots. This is appropriate for slot-based PDCCH monitoring according to the first PDCCH monitoring type. For span-based PDCCH monitoring according to the second PDCCH monitoring type, updating the parameter $Y_{p,n_{s,f}^\mu}$ per slot would result to an overlapping CCEs for some PDCCH candidates of different UEs being permanent within a slot. For example, for (X, Y)=(2, 2), if PDCCH candidates for different UEs overlap (have common CCEs) in one span, they would overlap in all spans within the slot thereby resulting to permanent blocking (inability to accurately receive) of all expect one PDCCH candidate within the slot. As a configuration of PDCCH monitoring according to (X, Y)=(2, 2) is intended for support of low scheduling latency, having such blocking of PDCCH candidates is detrimental and can lead to an inability to satisfy the scheduling latency requirements.

For example, a capability of a UE to monitor PDCCH according to combination (X, Y) is conditioned on the first symbols of two consecutive spans, including across slots, to be separated by at least X symbols. However, the UE capability depends on a time the UE has available for processing received PDCCH candidates before the UE is required to receive new PDCCH candidates. Then, a condition for the first symbols of two consecutive spans, including across slots, to be separated by at least X symbols can be unnecessarily restrictive.

In certain embodiments, PDCCH monitoring within a slot according to combination (X, Y) by a UE is supported by providing to the UE a higher layer parameter monitoringSymbolsWithinSlot that indicates a PDCCH monitoring pattern within a slot. It is beneficial for a UE design complexity that a UE capability to receive PDCCH in a symbol that is after the first three (3) symbols of a slot depends on whether the UE supports only the first PDCCH monitoring type or supports at least the second PDCCH monitoring type because corresponding scheduling latency capabilities are different, and a smaller scheduling latency is associated with the second PDCCH monitoring type. For a UE that supports only the first PDCCH monitoring type, a capability for PDCCH receptions after the third symbol of a slot can be motivated for enabling co-existence with the LTE radio access technology and can then be limited only to SCS configuration µ=0 because LTE supports only 15 kHz SCS.

If a reception of a PDCCH candidate by a UE includes at least one RE that is indicated by higher layers as unavailable, such as an RE indicated for use by a common reference signal (CRS) according to the LTE radio access technology or an RE indicated for rate matching due to potential transmission of other signaling, the UE is not required to receive the PDCCH candidate. However, as several PDCCH candidates may include such at least one RE and as for PDCCH monitoring according to a combination (X, Y) the number of PDCCH candidates per span can be small, an inability of a UE to receive such PDCCH candidates can have a material adverse effect on the capability of a network to schedule the UE and can consequently increase a corresponding scheduling latency.

Therefore, embodiments of the present disclosure take into consideration that there is a need to randomize locations of PDCCH candidates per span of Y symbols, or according to a duration of X symbols, when a UE is configured to monitor PDCCH according to a combination (X, Y).

Embodiments of the present disclosure also take into consideration that there is a need to determine conditions for a UE to monitor PDCCH according to a combination (X, Y).

Embodiments of the present disclosure further take into consideration that there is a need to determine a UE capability to receive PDCCH in a symbol of a slot that is after a third symbol of the slot according to a capability for a PDCCH monitoring type.

Additionally, embodiments of the present disclosure take into consideration that there is a need to determine a UE capability to receive PDCCH when some REs of the PDCCH reception are indicated as unavailable according to a capability for a PDCCH monitoring type.

Accordingly, embodiments of the present disclosure relate to randomizing locations of PDCCH candidates per span of Y symbols, or according to a duration of X symbols, when a UE is configured to monitor PDCCH according to a combination (X, Y). The present disclosure also relates to determining conditions for a UE to monitor PDCCH according to a combination (X, Y). The present disclosure further relates to determining a UE capability to receive PDCCH in a symbol of a slot that is after a third symbol of the slot according to a capability for a PDCCH monitoring type. Additionally, the present disclosure relates to determining a UE capability to receive PDCCH when some REs of the PDCCH reception are indicated as unavailable according to a capability for a PDCCH monitoring type.

Embodiments of the present disclosure provide for randomizing locations of PDCCH candidates per span of Y symbols transmissions. The following examples and embodiments describe Randomizing locations of PDCCH candidates per span of Y symbols transmissions.

As described below, an embodiment of this disclosure considers randomizing locations of PDCCH candidates per span of Y symbols, or per duration of X symbols, when a UE is configured to monitor PDCCH according to a combination (X, Y).

Considering the search space determination as described in Equation (1), a time unit for the variable $Y_{p,n_{s,f}^\mu}$ that results to a different first CCE location for PDCCH candidates in slot $n_{s,f}^\mu$ needs to change from a slot to a span (or to a duration). For PDCCH monitoring according to combination (X, Y), there are a maximum of $\lceil 14/Y \rceil$ spans per slot, or equivalently a maximum of $\lceil 14/Y \rceil$ durations per slot. In the following, the descriptions are with respect to span Y but an equivalent determination of a search space applies if the descriptions are with respect to duration X.

To enable randomization of a first CCE for PDCCH candidates in different spans, the time unit of a span $n_{Y,f}^\mu$ should be defined. Since there is a maximum of $\lceil 14/X \rceil$ spans per slot, $n_{Y,f}^\mu = n_{s,f}^\mu \cdot \lceil 14/X \rceil + i_Y$, where $i_Y$ is span index within a slot and $0 \le i_Y < \lceil 14/X \rceil$. Then, the search space determination can be generalized as described in Equation (2), below, to also support the second (span-based) PDCCH monitoring type according to combination (X, Y) wherein the remaining of the terminology is as described for Equation (1).

For a search space set s associated with CORESET p, the CCE indexes for aggregation level L corresponding to PDCCH candidate $m_{s,n_{CI}}$ of the search space set in slot $n_{s,f}^\mu$ if PDCCH monitoring is according to a first type (slot-based), or in span $n_{Y,f}^\mu$ if PDCCH monitoring is according to a second type (span-based), for an active DL BWP of a serving cell corresponding to carrier indicator field value $n_{CI}$ are given by Equation (2), below.

$$L \cdot \left\{ \left( Y_{p,t} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i \quad (2)$$

In Equation (2), for any CSS, $Y_{p,t}=0$. Additionally, in Equation (2), for a USS, $$Y_{p,t} = Y_{p,n_{s,f}^\mu}^\mu = \left(A_p \cdot Y_{p,n_{s,f}^\mu - 1}\right) \bmod D$$

if PDCCH monitoring is according to the first type, $$Y_{p,t} = Y_{p,n_{Y,f}^\mu}^\mu = \left(A_p \cdot Y_{p,n_{Y,f}^\mu - 1}\right) \bmod D$$

if PDCCH monitoring is according to the second type, $Y_{p,-1}=n_{RNTI}\neq 0$, $A_p=39827$ for p mod 3=0, $A_p=39829$ for p mod 3=1, $A_p=39839$ for p mod 3=2, and D=65537. Similar, using X instead of Y for span based monitoring according to combination $$(X, Y), Y_{p,t} = Y_{p,n_{X,f}^\mu}^\mu = \left(A_p \cdot Y_{p,n_{X,f}^\mu - 1}\right) \bmod D$$

in duration $n_{X,f}^\mu$. Although the embodiment considered that X<14 symbols, same principles apply when X is multiple slots such as 2, 4 or 8 slots.

Figure 16:
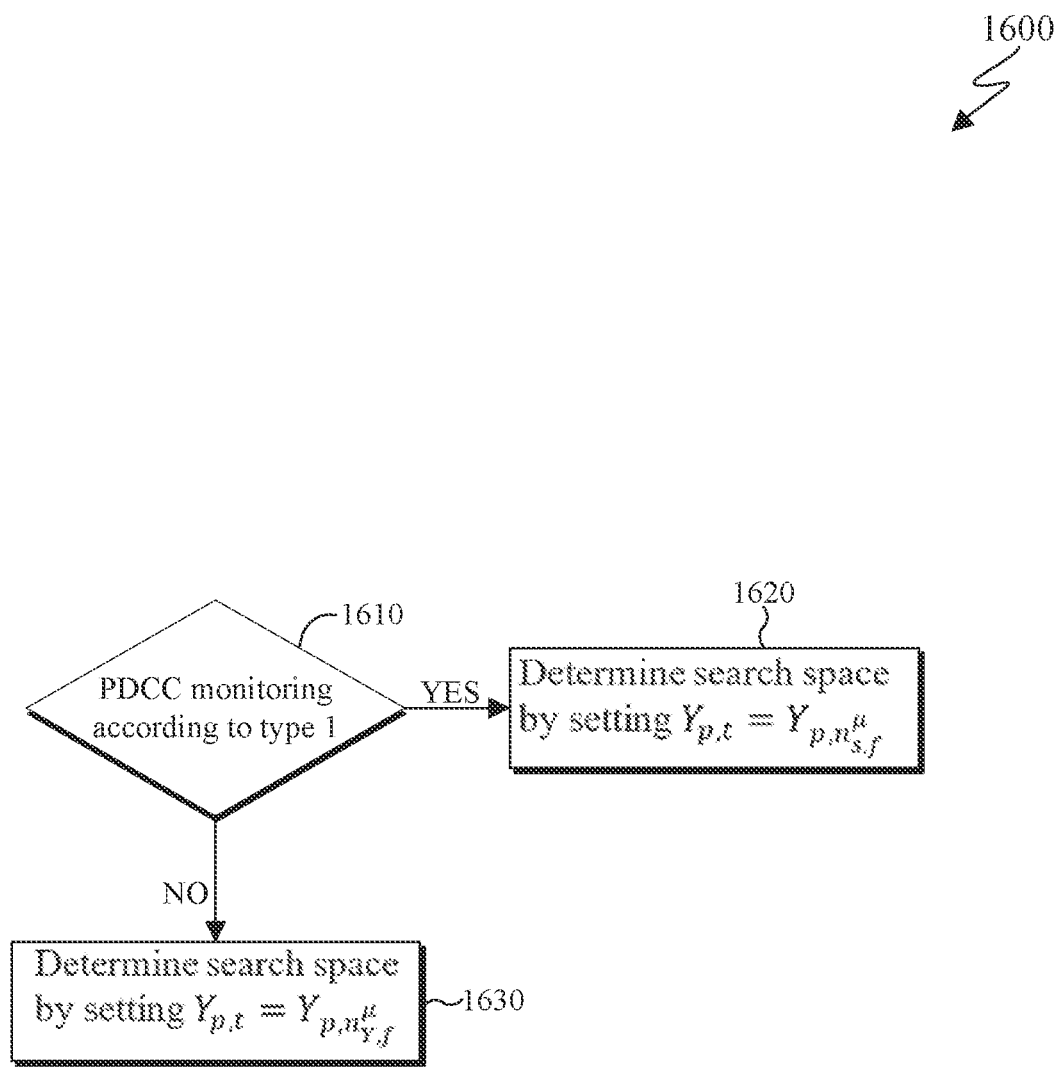
FIG. 16 illustrates a method for determining a search space according to embodiments of the present disclosure.

FIG. 16 illustrates a method 1600 for determining a search space according to embodiments of the present disclosure. For example, the steps of the method 1600 can be performed by any of the UEs 111-116 of FIG. 1, such as the UE 116 of FIG. 3. The method 1600 of FIG. 16 is for illustration only and other embodiments can be used without departing from the scope of the present disclosure.

As illustrated in FIG. 16, the method 1600 describes an example process for a UE to determine a search space set according to this disclosure.

In step 1610, the UE (such as the UE 116) determines whether PDCCH monitoring according to a search space set in a CORESET p and on an active DL BWP having SCS configuration $\mu$ is slot-based according to a first PDCCH monitoring type or span based using combination (X, Y) according to a second PDCCH monitoring type. When the PDCCH monitoring is according to the first PDCCH monitoring type (as determined in step 1610), the UE determines, in step 1620, CCEs for corresponding PDCCH candidates according to Equation (2) by setting $$Y_{p,t} = Y_{p,n_{s,f}^\mu}^\mu$$

where $n_{s,f}^\mu$ is a slot index. When the PDCCH monitoring is according to the second PDCCH monitoring type (as determined in step 1610), the UE determines, in step 1630, CCEs for corresponding PDCCH candidates according to Equation 2 by setting $$Y_{p,t} = Y_{p,n_{Y,f}^\mu}^\mu$$

where $n_{Y,f}^\mu$ is a span index, or by setting $$Y_{p,t} = Y_{p,n_{X,f}^\mu}^\mu$$

where $n_{X,f}^\mu$ is a duration index.

Although FIG. 16 illustrates the method 1600, various changes may be made to FIG. 16. For example, while the method 1600 of FIG. 16 is shown as a series of steps, various steps could overlap, occur in parallel, occur in a different order, or occur multiple times. In another example, steps may be omitted or replaced by other steps. For example, steps of the method 1600 can be executed in a different order.

Embodiments of the present disclosure provide for determining the combination (X, Y) for PDCCH monitoring. The following examples and embodiments describe determining the combination (X, Y) for PDCCH monitoring.

An embodiment of this disclosure considers conditions for a UE (such as the UE 116) to determine PDCCH monitoring according to a combination (X, Y).

In certain embodiments, a UE (such as the UE 116) monitors PDCCH according to combination (X, Y)=(7,3) and according to combination (X, Y)=(4,3). It is noted that the larger the X, the larger a maximum number of PDCCH candidates $M_{PDCCH}^{max,(X,Y),\mu}$ and a maximum number of non-overlapping CCEs $C_{PDCCH}^{max,(X,Y),\mu}$ that the UE can use to monitor PDCCH for SCS configuration $\mu$. For example, for SCS configuration $\mu=0$, $M_{PDCCH}^{max,(X,Y),\mu}=44$ and $C_{PDCCH}^{max,(X,Y),\mu}=56$ for (X, Y)=(7,3), while $M_{PDCCH}^{max,(X,Y),\mu}=28$ and $C_{PDCCH}^{max,(X,Y),\mu}=36$ for (X, Y)=(4,3).

It is therefore beneficial for a UE to use a combination (X, Y) with larger value of X whenever applicable based on a configuration of search space sets. The conditions for determining applicability of a combination (X, Y) relate to a processing time a UE has available for PDCCH processing after a last symbol of a PDCCH reception and prior to a first symbol of a next PDCCH reception. For a combination (X, Y), the processing time is X-Y. Using the criterion of having X-Y symbols between a last symbol of a PDCCH reception in a span and a first symbol of a PDCCH reception in an immediately next span is more appropriate than the criterion of having X symbols between a first symbol of a PDCCH reception in a span and a first symbol of a PDCCH reception in an immediately next span.

Figure 17:
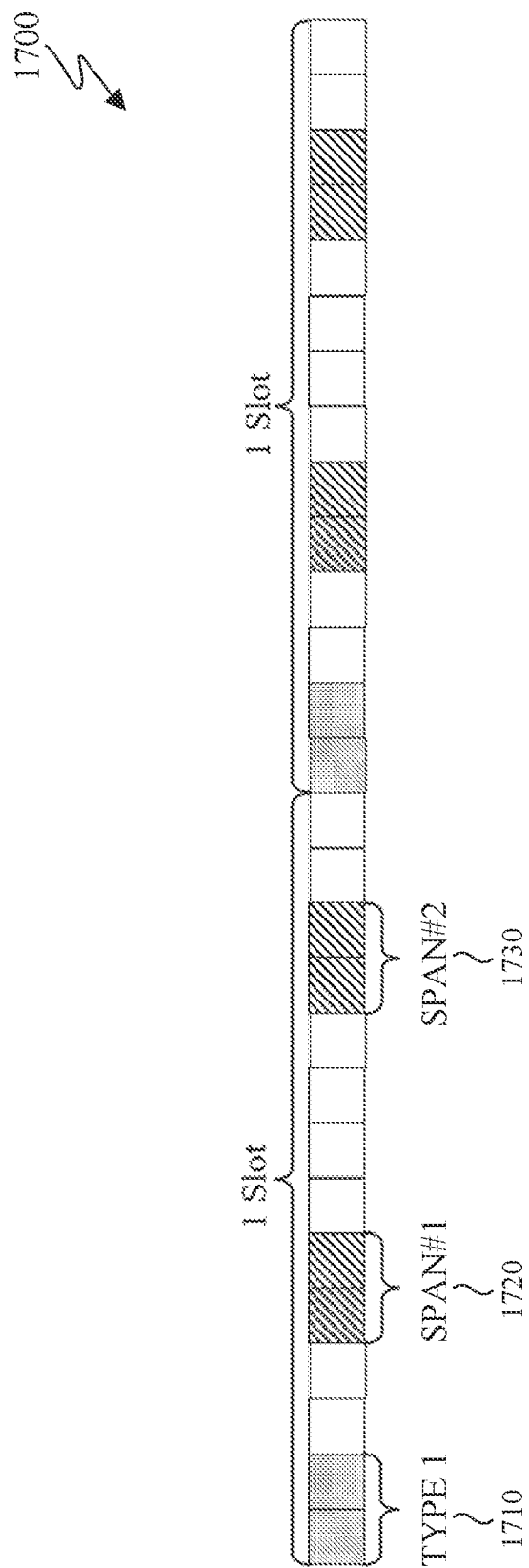
FIG. 17 illustrates an example diagram of a search space set configuration according to embodiments of the present disclosure.

FIG. 17 illustrates an example diagram 1700 of a search space set configuration according to embodiments of the present disclosure.

As illustrated in FIG. 17, the diagram 1700 describes an example search space set configuration and two possible criteria to determine a corresponding (X, Y) combination according to embodiments of the present disclosure.

A UE (such as the UE 116) can configure a first search space set for a first type (slot-based) PDCCH monitoring 1710 and a second search space set for a second type (span-based) PDCCH monitoring. For example, a first span 1720 is over the third and fourth symbols of a slot and a second span 1730 is over the ninth and tenth symbols of the slot.

If the determination of a combination (X, Y) for the second type PDCCH monitoring by the UE is based on a number of symbols between first symbols of two consecutive spans, the combination is (X, Y)=(4,3) as the number of symbols needs to be at least X symbols and it is 6 symbols. If the determination of a combination (X, Y) for the second type PDCCH monitoring by the UE is based on a number of symbols between a last symbol of a span and a first symbol of a next span, the combination is (X, Y)=(7,3) as the number of symbols needs to be at least X-Y symbols and it is 4 symbols.

Therefore, it is preferable that if the UE monitors PDCCH on a cell according to combination (X, Y), the UE supports PDCCH monitoring occasions in any symbol of a slot with minimum time separation of X-Y symbols between a last symbol of a span and a first symbol of an immediately next span (for any two consecutive spans), including across slots.

Embodiments of the present disclosure provide for determining a UE capability to monitor PDCCH within a slot according to PDCCH SCS. The following examples and embodiments describe determining a UE capability to monitor PDCCH within a slot according to PDCCH SCS.

An embodiment of this disclosure considers a determination of a UE (such as the UE 116) capability to receive PDCCH in a symbol of a slot that is after a third symbol of the slot according to a capability for a PDCCH monitoring type.

In certain embodiments, a UE determines PDCCH monitoring within a slot according to combination (X, Y) based on a PDCCH monitoring pattern within the slot provided by higher layer parameter monitoringSymbolsWithinSlot. For a first type (slot-based) PDCCH monitoring, the UE may not have a capability to receive PDCCH in a symbol of a slot that is after a predetermined first number of symbols of the slot, such as 3 symbols, or may have the capability only for SCS configuration µ=0 (15 kHz), for example to support coexistence with LTE radio access technology in a same bandwidth. For a second type (span-based) PDCCH monitoring, a UE needs to have a capability to receive PDCCH after the first 3 symbols of a slot as the purpose of the second type PDCCH monitoring is to minimize scheduling latency. Therefore, a UE capability to receive PDCCH after the first 3 symbols of a slot for SCS configuration µ>0 can be associated with a UE capability for PDCCH monitoring according to the first type of the second type.

For example, as the slot duration for SCS configuration µ=2 is 0.25 msec and is small enough for typical services requiring low latency, the UE capability to receive PDCCH after the first 3 symbols of a slot for the second type PDCCH monitoring can be limited to SCS configuration µ=1 (slot duration is 0.5 msec) in addition to SCS configuration µ=0.

Figure 18:
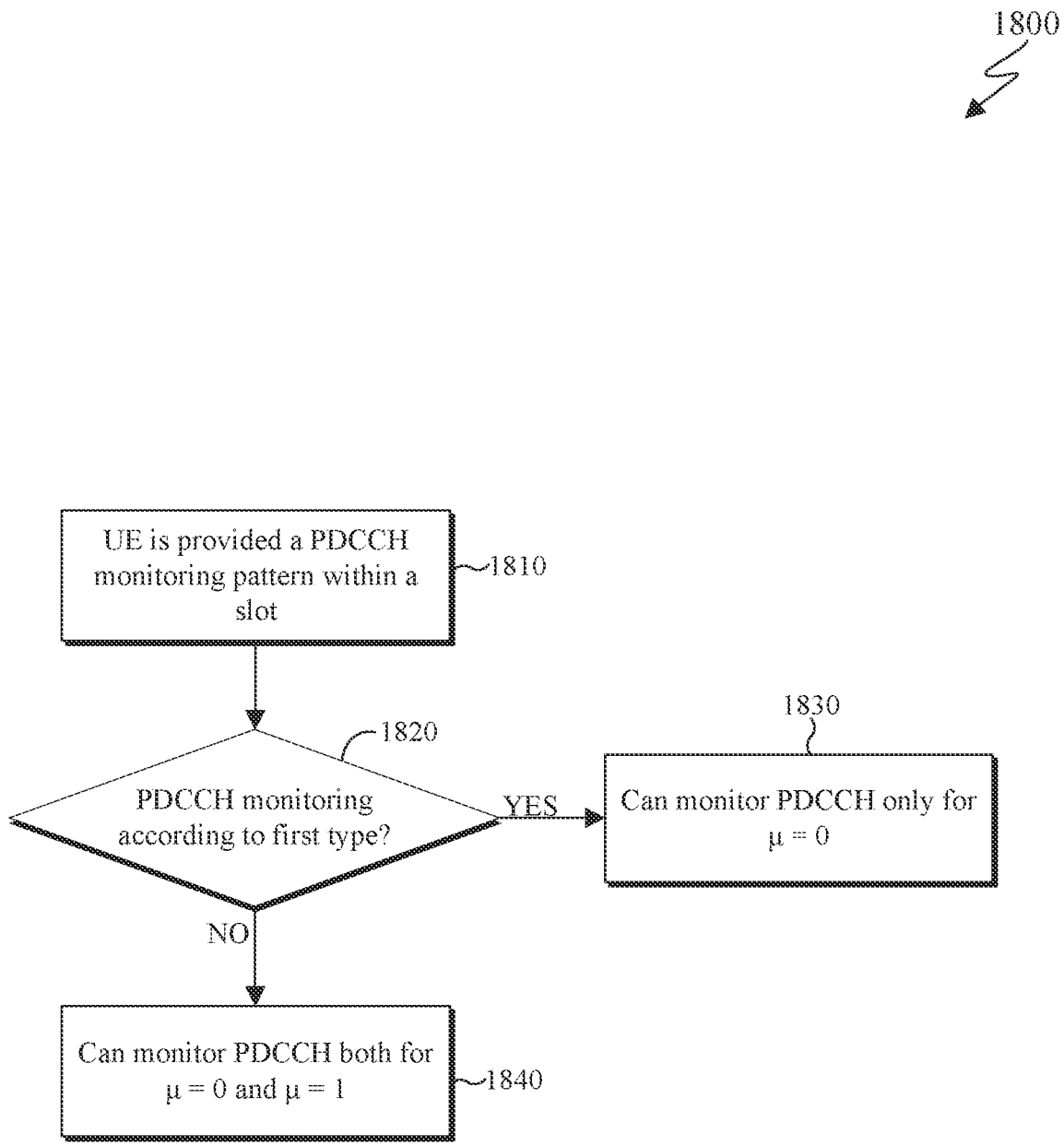
FIG. 18 illustrates a method for determining a UE capability for receiving PDCCH according to embodiments of the present disclosure.

FIG. 18 illustrates a method 1800 for determining a UE capability for receiving PDCCH according to embodiments of the present disclosure. For example, the steps of the method 1800 can be performed by any of the UEs 111-116 of FIG. 1, such as the UE 116 of FIG. 3. The method 1800 of FIG. 18 is for illustration only and other embodiments can be used without departing from the scope of the present disclosure.

As illustrated in FIG. 18, the method 1800 describes a determination of a UE capability to receive PDCCH based on a PDCCH monitoring pattern that includes symbols after a last symbol of the slot according to this disclosure.

In step 1810, a UE (such as the UE 116) is provided by higher layers a configuration for a search space set that includes a parameter monitoringSymbolsWithinSlot that indicates a PDCCH monitoring pattern within a slot. In step 1820, the UE determines whether PDCCH monitoring on an active DL BWP having SCS configuration µ is slot-based according to a first PDCCH monitoring type or span-based based using combination (X, Y) according to a second PDCCH monitoring type.

When the PDCCH monitoring is according to the first PDCCH monitoring type (as determined in step 1820), the UE, in step 1830, monitors PDCCH only for SCS configuration µ=0. When the PDCCH monitoring is according to the second PDCCH monitoring type (as determined in step 1820), the UE, in step 1840, monitors PDCCH both for SCS configuration µ=0 and for SCS configuration µ=1.

In certain embodiments, a UE capability to monitor PDCCH within a slot for SCS configuration µ=1 can also be applicable for a UE configured with first type (slot-based) PDCCH monitoring by a configuration for a search space set that includes higher layer parameter dci-Format2-4. The higher layer parameter dci-Format2-4 indicates that the UE is configured to detect a DCI format 2_4 according to the search space set, wherein DCI format 2_4 is used to indicate a set of resources where UEs need to cancel PUSCH or SRS transmissions. The purpose of such cancellation of transmissions is to free time-frequency resources for transmission of low scheduling traffic that is typically scheduled after the PUSCH or SRS transmissions to be cancelled, a UE that can support PDCCH monitoring for detection of DCI format 2_4 needs to support PDCCH monitoring within a slot including for SCS configuration µ=1.

Although FIG. 18 illustrates the method 1800, various changes may be made to FIG. 18. For example, while method 1800 of FIG. 18 is shown as a series of steps, various steps could overlap, occur in parallel, occur in a different order, or occur multiple times. In another example, steps may be omitted or replaced by other steps. For example, steps of the method 1800 can be executed in a different order.

Embodiments of the present disclosure provide for determining UE capabilities for monitoring a PDCCH candidate that includes REs indicated as unavailable. The following examples and embodiments consider a determination of a UE capability to receive a PDCCH candidate that includes REs that the UE is indicated to be unavailable.

For example, the indication can be based on layer 1 signaling through a DCI format or on higher layer signaling that can be broadcast, for example through system information or paging, or UE-specific for example through a PDSCH scheduled to the UE that includes radio resource control (RRC) signaling.

In certain embodiments, if a UE (such as the UE 116) monitors PDCCH according to a first type (slot-based PDCCH monitoring), the UE typically has a sufficient number of PDCCH candidates or non-overlapping CCEs and does not need to incur an additional complexity for rate matching or puncturing for REs of a PDCCH candidate that are indicated as unavailable in order to receive the PDCCH candidate. If a UE monitors PDCCH according to a second type that is span-based, a number of candidates or a number of non-overlapping CCEs can be significantly smaller than for slot-based PDCCH monitoring. For example, SCS configuration µ=1, a maximum number of PDCCH candidates or non-overlapping CCEs can be 36 or 56 respectively for slot-based PDCCH monitoring and 12 and 18 respectively for span-based PDCCH monitoring with combination (X, Y)=(2,2). For example, as PDCCH monitoring for combination (X, Y)=(2,2) can be throughout a slot and as other signaling, such as a CRS when the operation coexists with LTE operation or a CSI-RS, for which REs are indicated as unavailable can be over the entire active DL BWP, it may not be possible in practice for the UE to receive any PDCCH candidate in symbols that include such REs. Therefore, a UE with the second type (span-based) of PDCCH monitoring can be required to rate match or puncture a reception of a PDCCH candidate in REs that the UE has been indicated to be unavailable for PDCCH reception.

Figure 19:
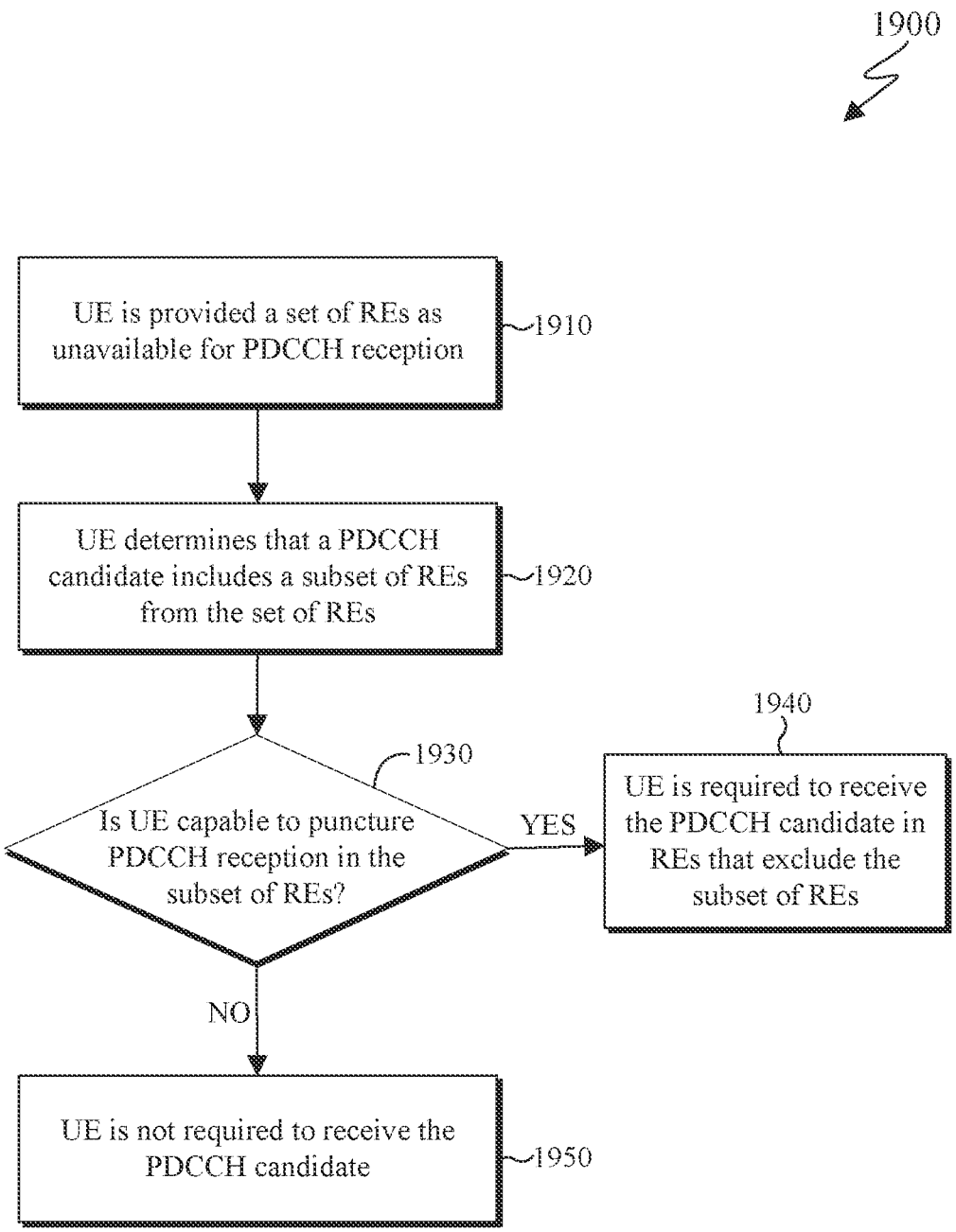
FIG. 19 illustrates a method for determining whether to drop or rate match according to embodiments of the present disclosure.

FIG. 19 illustrates a method 1800 for determining a UE capability for receiving PDCCH according to embodiments of the present disclosure. For example, the steps of the method 1800 can be performed by any of the UEs 111-116 of FIG. 1, such as the UE 116 of FIG. 3. The method 1900 of FIG. 19 is for illustration only and other embodiments can be used without departing from the scope of the present disclosure.

As illustrated in FIG. 19, the method 1900 describes a determination by a UE whether to drop or whether to rate match or puncture a reception of a PDCCH candidate that includes REs indicated to the UE as unavailable for PDCCH reception according to this disclosure.

In step 1910, a UE (such as the UE 116) is provided by higher layers a set of REs as unavailable for PDCCH reception. In step 1920, the UE determines that a PDCCH candidate includes a subset of REs from the set of REs. In step 1930, the UE determines whether the UE is required to rate match or puncture a reception of the PDCCH candidate in the subset of REs. When the UE is required to rate match or puncture the PDCCH reception in the subset of REs (as determined in step 1930), the UE, in step 1940, receives the PDCCH candidate in corresponding REs that exclude the subset of REs. Alternatively, in step 1950, the UE may not receive the PDCCH candidate.

In certain embodiments, rate matching or puncturing for REs of a PDCCH candidate by a UE to avoid REs indicated as unavailable for reception of the PDCCH candidate can also apply regardless of the PDCCH monitoring type. For example, rate matching or puncturing for a PDCCH candidate can depend on a number of PDCCH candidates for a corresponding DCI format or on the DCI format. For example, for a DCI format providing system or paging information in a CSS, referred to as DCI format 1_0, or for a DCI format indicating an UL-DL configuration in a slot or a set of slots, referred to as DCI format 2_0, or for a DCI format indicating cancelation of PUSCH or SRS transmissions by UEs, referred to as DCI format 2_4, the UE may have few PDCCH candidates, such as one or two PDCCH candidates. Then, even though PDCCH monitoring for detection of the above DCI formats can be slot based, it can be necessary in practice for the UE to rate match or puncture a reception of a PDCCH candidate in REs that are indicated as unavailable and receive the PDCCH candidate. The UE can be required to rate match or puncture in unavailable REs a PDCCH reception for detection of a predetermined DCI format, such as a DCI format 1_0, DCI format 2_0, or DCI format 2_4, or for detection of DCI formats that the UE monitors corresponding PDCCH candidates according to a CSS, and not be required to receive PDCCH candidates that include unavailable REs for other DCI formats such as DCI formats that the UE monitors corresponding PDCCH candidates according to a USS.

In certain embodiments, rate matching or puncturing a reception of a PDCCH candidate by a UE in REs indicated as unavailable to the UE can also depend on the number of the REs. For example, if rate matching or puncturing would lead to a code rate for a DCI format associated with the PDCCH candidate that is above a code rate, the UE can skip the reception of the PDCCH candidate. For example, the code rate can be predetermined in the system operation or be provided to the UE by higher layers.

Although FIG. 19 illustrates the method 1900, various changes may be made to FIG. 19. For example, while method 1900 of FIG. 19 is shown as a series of steps, various steps could overlap, occur in parallel, occur in a different order, or occur multiple times. In another example, steps may be omitted or replaced by other steps. For example, steps of the method 1900 can be executed in a different order.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   receiving:
      first information for first and second scheduling cells of a scheduled cell, and
      second information for first and second search space sets for receptions of physical downlink control channels (PDCCHs) from the first and second scheduling cells, respectively, wherein:
         the PDCCHs provide downlink control information (DCI) formats with cyclic redundancy checks (CRCs) scrambled by: a cell radio network temporary identifier (C-RNTI), a configured scheduling RNTI (CS-RNTI), or a modulation and coding scheme C-RNTI (MCS-C-RNTI), and
         the DCI formats schedule physical uplink shared channel (PUSCH) transmissions, or physical downlink shared channel (PDSCH) receptions, on the scheduled cell;
   determining whether to receive the PDCCHs either only from the first scheduling cell or only from the second scheduling cell within a time unit based on the second information; and
   receiving the PDCCHs either only from the first scheduling cell or only from the second scheduling cell within the time unit, wherein the time unit has a downlink direction for both the first and second scheduling cells.

2. The method of claim 1, further comprising:
   transmitting a PUSCH on the scheduled cell, wherein the PUSCH transmission is scheduled by a DCI format from the DCI formats.

3. The method of claim 1, wherein the time unit is a slot of the first scheduling cell or a slot of the second scheduling cell.

4. The method of claim 1, wherein the time unit is a slot of the scheduled cell.

5. The method of claim 1, further comprising:
   determining a Type-1 hybrid automatic repeat request acknowledgement (HARQ-ACK) codebook for a slot of the scheduled cell based on:
      indexes of first control resource sets (CORESETs) on the first scheduling cell, and
      indexes of second CORESETs on the second scheduling cell, wherein the PDCCHs from the first scheduling cell and the second scheduling cell are respectively received in the first CORESETs and the second CORESETs.

6. The method of claim 1, further comprising:
changing an active downlink bandwidth part (DL BWP) to a default DL BWP on the first scheduling cell; and
changing a configuration of search space sets for the PDCCH receptions from the second scheduling cell.

7. The method of claim 1, further comprising:
receiving a PDCCH that provides a DCI format with a CRC scrambled by a PS-RNTI that indicates to not start a timer for a next discontinuous reception (DRX) cycle on a primary cell; and
suspending the PDCCH receptions from the primary cell and from a secondary cell during the next DRX cycle, wherein:
the first scheduling cell is the primary cell, and
the second scheduling cell is the secondary cell.

8. A user equipment (UE) comprising:
a transceiver configured to receive:
first information for first and second scheduling cells of a scheduled cell, and
second information for first and second search space sets for receptions of physical downlink control channels (PDCCHs) from the first and second scheduling cells, respectively, wherein:
the PDCCHs provide downlink control information (DCI) formats with cyclic redundancy checks (CRCs) scrambled by: a cell radio network temporary identifier (C-RNTI), a configured scheduling RNTI (CS-RNTI), or a modulation and coding scheme C-RNTI (MCS-C-RNTI), and
the DCI formats schedule physical uplink shared channel (PUSCH) transmissions, or physical downlink shared channel (PDSCH) receptions, on the scheduled cell; and
a processor operably coupled to the transceiver, the processor configured to determine whether reception of the PDCCHs is either only from the first scheduling cell or only from the second scheduling cell within a time unit based on the second information,
wherein the transceiver is further configured to receive the PDCCHs either only from the first scheduling cell or only from the second scheduling cell within the time unit, wherein the time unit has a downlink direction for both the first and second scheduling cells.

9. The UE of claim 8, wherein:
the transceiver is further configured to transmit a PUSCH on the scheduled cell, wherein the PUSCH transmission is scheduled by a DCI format from the DCI formats.

10. The UE of claim 8, wherein the time unit is a slot of the first scheduling cell or a slot of the second scheduling cell.

11. The UE of claim 8, wherein the time unit is a slot of the scheduled cell.

12. The UE of claim 8, wherein:
the processor is further configured to construct a Type-1 hybrid automatic repeat request acknowledgement (HARQ-ACK) codebook for a slot of the scheduled cell based on:
indexes of first control resource sets (CORESETs) on the first scheduling cell, and
indexes of second CORESETs on the second scheduling cell, wherein the PDCCHs from the first scheduling cell and the second scheduling cell are respectively received in the first CORESETs and the second CORESETs.

13. The UE of claim 8, wherein the processor is further configured to:
change an active downlink bandwidth part (DL BWP) to a default DL BWP on the first scheduling cell; and
change a configuration of search space sets for the PDCCH receptions from the second scheduling cell.

14. The UE of claim 8, wherein:
the transceiver is further configured to:
receive a PDCCH that provides a DCI format with CRC scrambled by a PS-RNTI that indicates to not start a timer for a next discontinuous reception (DRX) cycle on a primary cell; and
suspend the PDCCH receptions from the primary cell and from a secondary cell during the next DRX cycle, wherein:
the first scheduling cell is the primary cell, and
the second scheduling cell is the secondary cell.

15. A base station comprising:
a transceiver configured to transmit:
first information for first and second scheduling cells of a scheduled cell, and
second information for first and second search space sets for receptions of physical downlink control channels (PDCCHs) from the first and second scheduling cells, respectively, wherein:
the PDCCHs provide downlink control information (DCI) formats with cyclic redundancy check (CRC) scrambled by: a cell radio network temporary identifier (C-RNTI), a configured scheduling RNTI (CS-RNTI), or a modulation and coding scheme C-RNTI (MCS-C-RNTI), and
the DCI formats schedule physical uplink shared channel (PUSCH) transmissions, or physical downlink shared channel (PDSCH) receptions, on the scheduled cell; and
a processor operably coupled to the transceiver, the processor configured to determine whether transmission of the PDCCHs is either only from the first scheduling cell or only from the second scheduling cell within a time unit according to the second information,
wherein the transceiver is further configured to transmit the PDCCHs either only from the first scheduling cell or only from the second scheduling cell within the time unit, wherein the time unit has a downlink direction for both the first and second scheduling cells.

16. The base station of claim 15, wherein:
the transceiver is further configured to receive a PUSCH on the scheduled cell, wherein the PUSCH reception is scheduled by a DCI format from the DCI formats.

17. The base station of claim 15, wherein the time unit is a slot of the first scheduling cell or a slot of the second scheduling cell.

18. The base station of claim 15, wherein the time unit is a slot of the scheduled cell.

19. The base station of claim 15, wherein:
the processor is further configured to deconstruct a Type-1 hybrid automatic repeat request acknowledgement (HARQ-ACK) codebook for a slot of the scheduled cell based on:
indexes of first control resource sets (CORESETs) on the first scheduling cell, and
indexes of second CORESETs on the second scheduling cell, wherein the PDCCHs from the first scheduling cell and the second scheduling cell are respectively received in the first CORESETs and the second CORESETs.

20. The base station of claim 15, wherein the processor is further configured to:
- change an active downlink bandwidth part (DL BWP) to a default DL BWP on the first scheduling cell; and
- change a configuration of search space sets for the PDCCH transmissions from the second scheduling cell.

* * * * *